United States Patent [19]
Terasawa et al.

[11] Patent Number: 6,016,139
[45] Date of Patent: Jan. 18, 2000

[54] MOTION PICTURE REPRODUCING AND RECORDING/REPRODUCTION APPARATUS

[75] Inventors: Hideo Terasawa, Kanagawa; Yoshio Kondo, Tokyo; Naoki Nagano, Tokyo; Kunihito Sawai, Tokyo, all of Japan

[73] Assignee: Sony Corporation, Tokyo, Japan

[21] Appl. No.: 08/932,788

[22] Filed: Sep. 18, 1997

Related U.S. Application Data

[60] Continuation of application No. 08/423,124, Apr. 17, 1995, which is a division of application No. 08/141,627, Oct. 27, 1993, abandoned.

[30] Foreign Application Priority Data

Nov. 5, 1992 [JP] Japan .................................... 4-321259
Nov. 5, 1992 [JP] Japan .................................... 4-321260
Nov. 5, 1992 [JP] Japan .................................... 4-321261

[51] Int. Cl.⁷ .............................. G09G 5/08; H04N 5/44
[52] U.S. Cl. ........................ 345/169; 345/157; 348/734; 359/146
[58] Field of Search ............................ 348/734; 345/169, 345/157, 161, 145, 167, 184, 156, 162; 360/73.08, 73.09, 71; 364/709.15; 341/22; 463/37; 273/148 B; 708/145; 359/146

[56] References Cited

U.S. PATENT DOCUMENTS

| | | | |
|---|---|---|---|
| 4,777,483 | 10/1988 | Fowler | 345/184 |
| 4,866,542 | 9/1989 | Shimoda et al. | 360/71 |
| 5,182,557 | 1/1993 | Lang | 345/161 |
| 5,313,282 | 5/1994 | Hayashi | 348/734 |
| 5,371,553 | 12/1994 | Kawamura et al. | 348/734 |
| 5,457,448 | 10/1995 | Totsuka et al. | 348/734 |
| 5,594,673 | 1/1997 | Coffin | 364/709.15 |

FOREIGN PATENT DOCUMENTS

| | | |
|---|---|---|
| 0231659 | 8/1987 | European Pat. Off. . |
| 0410579 A2 | 1/1991 | European Pat. Off. . |
| 4107891 | 9/1992 | Germany . |
| 2186668 | 8/1987 | United Kingdom . |
| WO 94/03897 | 2/1994 | WIPO . |

OTHER PUBLICATIONS

CHI'92 Conference Proceedings, May 3–7, 1992 Monterey, California, pp. 93–98, XP 000426811 Micheal Mills et al. "A Magnifier Tool for Video Data" * p. 95, left col., line 1–right col., line 8; figures 1–3, 8*.

IBM Technical Disclosure Bulletin, vol. 21, No. 7 Dec. 1978, Armonk USA, pp. 3024–3025, XP 002001486 "Thumbwheel positional control unit" *whole document*.

Patent Abstract of Japan vol. 016, No. 186 (p–1347), May 7, 1992 & JP–A–04023028 (Sega Enterp. LTD), Jan. 27, 1992 *Abstract*.

*Primary Examiner*—Lun-Yi Lao
*Attorney, Agent, or Firm*—Frommer Lawrence & Haug, LLP.; William S. Frommer; Dennis M. Smid

[57] ABSTRACT

In a motion picture reproducing apparatus, or a motion picture recording and reproducing apparatus, an index picture storage means stores a plurality of index pictures extracted from a series of motion pictures in time sequence at a assigned extraction timing in respective storage positions in a motion picture storage medium by associating each index picture with a different storage position. An index picture display means arranges and displays the index pictures read from the index picture storage means on the display screen in time sequence. Selective means select a desired target reproduction picture to be reproduced, and reproduction position control means allow movement to a recording position corresponding to the selected target reproduction position to initiate a reproducing operation, thus allowing search conditions to be visually and intuitively determined when searching stored data on the motion picture storage medium, and providing substantially improved user-friendliness.

6 Claims, 30 Drawing Sheets

FIG. 27A
FIG. 27B
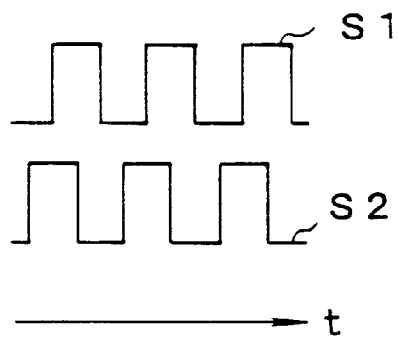
FIG. 28A
FIG. 28B
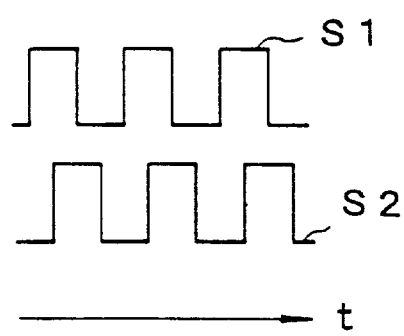
FIG. 29
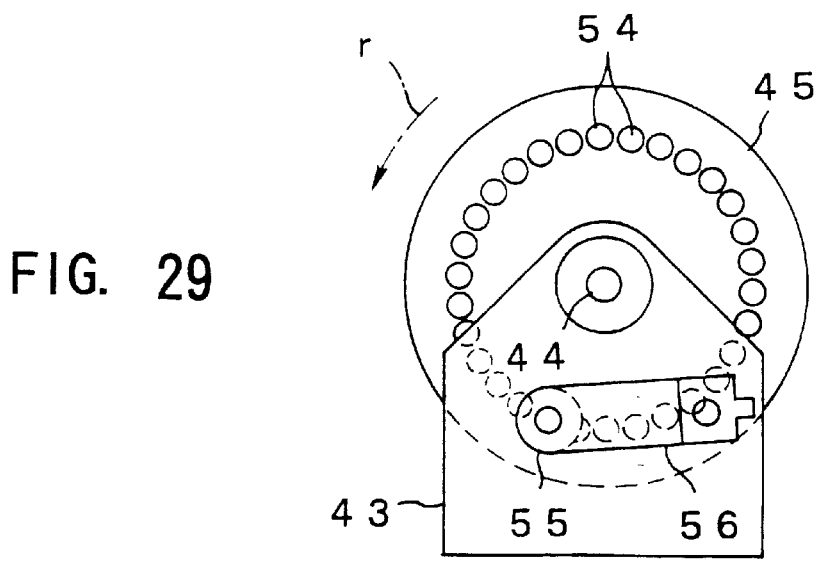

MOTION PICTURE REPRODUCING AND RECORDING/REPRODUCTION APPARATUS

This application is a continuation of application Ser. No. 08/423,124, filed Apr. 17, 1995 which is a division of 08/141,627, filed Oct. 27, 1993, now abandoned.

BACKGROUND OF THE INVENTION

1. Field of the Invention

This invention relates to a motion picture reproducing apparatus and a motion picture recording/reproducing apparatus and more particularly, is applicable to apparatuses which use a plurality of index pictures composed of a series of motion pictures in time sequence to execute search processing.

2. Description of the Related Art

Conventionally, various methods for searching desired storage data in a simple way have been proposed for motion picture recording and reproducing apparatuses such as video tape recorders (VTRs). For example, video tape recorders with a simple constitution allow data to be searched by repeating fast forward and reproducing operations while visually checking the position of the tape with a tape counter. Some other video tape recorders allow storage data to be searched, for example, by reproducing the magnetic tape in fast forward mode.

However, when fast forward and reproducing modes are repeated or when the tape is reproduced in fast forward mode, there is a problem that desired storage contents can not be searched in a simple way. Thus, a method for searching storage data using as references index signals recorded in control tracks formed in the longitudinal direction of a magnetic tape has been proposed. However, when fast forward and reproducing operations are repeated, when the tape is reproduced in fast forward mode, or when index signals are used for reference, it is difficult for users to intuitively determine the feed amount of the magnetic tape during the time needed for search.

It is a disadvantage of video tape recorders that search takes time while the magnetic tape is fast forwarded or rewound. In this case, allowing the current or target position of the tape to be visually and intuitively determined during search may provide a more user-friendly and convenient video tape recorder.

Further, there have been proposed in, for example, Japanese Patent Application Laid Open No. 229483/1989 and No. 214082/1990 in which a plurality of index pictures are extracted from the motion picture continuously recorded on the magnetic tape by the VTR for one frame unit, and a plurality of index pictures are reduced and displayed as a list on the CRT (cathord ray tube) display. However, in any these related arts, it is necessary that the number given on each picture is inputted from the key board as a means for selecting the desired picture from a list of a plurality of index pictures. Thus, since the desired picture can not be selected on the display picture directly and intuitively, there is a problem that the extremely complicated operation is required for user.

Also, in conventional controllers for video cassette recorders (VCRs), a method is used in which the movement of a tape is controlled by controlling a discoid jog dial and a shuttle ring provided on the circumference of said jog dial.

In this method, the jog dial is made capable of 360° rotation with click actions at every predetermined angle, while force is applied to the shuttle ring to return it to the predetermined rotational position and the shuttle ring is made always to return to this rotational position.

Thus when VCR pictures are to be looked at frame by frame, for example, the jog dial is rotated to feed pictures one by one at each click action of the Jog dial. When the tape is fast-forwarded or rewound, on the other hand, the shuttle ring is rotated to fast-forward the tape or to rewind the tape at a speed corresponding to the angle of rotation of the shuttle ring.

In this type of controller, however, since the jog dial, having the function of click action, and the shuttle ring, having the function of returning to the center, are composed of separate operators, the entire device becomes large in size.

If such click actions and center returning actions could be controlled using a single operator, the operation would become much more convenient.

When such a controller is used as a remote control, one hand must be used to hold the remote control body, while the fingers of the other hand must be used to manipulate the jog dial and the shuttle ring. Besides this inconvenience, quick operation is difficult with such a controller.

Furthermore, in conventional jog dials and shuttle rings, since the rotational direction on the plane corresponds to the direction of the time axis, the direction of operation may deviate from the direction of human recognition of time flow.

Moreover, if this operator could perform other operators, such as operating the cursor displayed on the screen, as well as controlling the movement of the tape, functionality would be much improved.

SUMMARY OF THE INVENTION

In view of the foregoing, a first object of this invention is to provide a motion picture reproducing apparatus and a motion picture recording/reproducing apparatus which allow search conditions to be visually and intuitively determined when searching storage data to substantially improve user-friendliness.

A second object of the invention is to provide a controller with reduced size and with improved operational properties and functionality.

The first object and other objects of the invention have been achieved by the provision of a motion picture reproducing apparatus 1 of this invention which reproduces motion pictures from a motion picture recording medium in which a series of motion pictures are recorded in time sequence to display them on a display screen DSP comprises a index picture storage means 33 which stores a plurality of index pictures IDX extracted from a series of motion pictures in time sequence with an assigned timing by associating the index pictures with respective storage positions on the motion picture recording medium, an index picture display means 25 which arranges and displays the index pictures IDX read from the index picture storage means 33 on the display screen DSP in time sequence, selection means 7, 23, and 24 which select a desired target reproduction picture to be reproduced from the index pictures IDX arranged and displayed on the display screen DSP, and reproducing position control means 22 and 34 which allow movement to a recording position on the motion picture recording medium corresponding to the target reproduction picture selected by the selection means 7, 23, and 24 to initiate a reproducing operation.

A motion picture reproducing apparatus 1 of this invention, also, reproduces motion pictures from a motion picture recording medium in which a series of motion pictures are recorded in time sequence to display them on a display screen DSP comprises an index picture storage means 33 which stores a plurality of index pictures IDX extracted from a series of motion pictures in time sequence with an assigned timing by associating the index pictures with respective storage positions on the motion picture recording medium, a scale display means 25 which arranges and displays the scale SK indicating the recording area of the motion picture recording medium on the display screen DSP, a reproduction starting position assignment means 7 which assigns the desired reproduction starting position from the scale SK displayed on the display screen DSP, a index picture display means 25 which displays the index picture IDG corresponding to the position assigned by the reproduction starting position assignment means 7, 23, and 24 on the display screen DSP after reading from the index picture storage means 33, and reproducing position control means 22 and 34 which allow movement to a recording position on the motion picture recording medium corresponding to the position assigned by the reproduction starting position assignment means 7, 23, and 24 to initiate a reproducing operation.

The motion picture recording medium comprises a magnetic tape. The reproducing position control means also include a running control mechanism for the magnetic tape which fast forwards or rewinds the tape to move it to a recording position corresponding to the selected target reproduction picture and then initiates a reproducing operation.

The motion picture recording medium also can comprise an optical disk or a magneto-optical disk.

In addition, the index picture storage means stores a plurality of index pictures extracted from a series of motion pictures in time sequence at an assigned extraction timing by associating the index pictures with respective recording positions on the motion picture recording medium with each index picture reduced to a specified number of pixels.

Furthermore, the index picture storage means stores a plurality of index pictures extracted from a series of motion pictures in time sequence with an assigned extraction timing by associating the index pictures with respective recording positions on the motion picture recording medium, with each index picture reduced to an assigned number of pixels and compressed by an assigned data compression method.

In addition, the index picture storage means is provided in a case which houses the motion picture recording medium and has a connection means providing an electrical connection between the index picture storage means and the main body of the apparatus. Furthermore, the index picture storage means comprises a read-only semiconductor memory which is electrically erasable and rewritable.

In addition, a preset region on the motion picture recording medium is assigned as the index picture storage means. Furthermore, an assigned region of the recording start position of the motion picture recording medium is assigned as the index picture storage means. An assigned region of the recording end position of the motion picture recording medium is also assigned as the index picture storage means.

Furthermore, the index picture storage means is built into the main body of the apparatus. In addition, the index picture storage means comprises a writable and readable semiconductor memory which is backed up by a power supply. Furthermore, the index picture storage means comprises a read-only semiconductor memory which is electrically erasable and rewritable. In addition, the index picture storage means comprises a hard disk apparatus.

Furthermore, the index picture display means arranges and displays on the display screen in time sequence an assigned number of index pictures which are selected by the selection means, including a target reproduction picture. In addition, the index picture display means arranges and displays as matrices on the display screen in time sequence an assigned number of index pictures which are selected by the selection means, including a target reproduction picture. Furthermore, the index picture display means arranges and displays in a single horizontal column on the display screen in time sequence a specified number of index pictures read from the index picture storage means.

In addition, the selection means include a position assignment means which assigns any position along the arrangement direction of a plurality of index pictures arranged and displayed on the display screen and a cursor display means which displays a cursor of a specific shape in a position assigned by the position assigning means to indicate a target picture.

Furthermore, the scale display means arranges and displays the band shaped scale for recalling the recording area of the motion picture recording medium on the display screen. Further, in this invention, the band shaped scale is displayed as a straight line shape, and the band shaped scale is displayed as a curved line shape.

Furthermore, the reproduction starting position assigning means is arranged to be provided with the position assigning means for assigning the arbitrary position being along the longer scale direction of the scale displayed on the display screen, and to be provided with the cursor display means for displaying the specific shaped cursor on the position assigned by the position assigning means to indicate a target picture.

Furthermore, the position assigning means comprises a roller which is rotatably supported and a rotation detection means which detects the rotation of the roller. The cursor display means displays a cursor of a specific shape in a position corresponding to the output of the rotation detection means to indicate a target picture. In addition, the roller and the rotation detection means are housed in the main body of the apparatus. The roller and the rotation detection means are also housed in a remote control device which transmits various operational instructions to the main body of the device by radio or wire.

In addition, the cursor display means displays an animated picture which suggests an object or a living body moving to a new position if the position assigning means assigns it. More specifically, the cursor display means displays an animated picture which suggests an object or a living body running, walking, swimming, or flying to a new position assigned by the position assigning means.

In addition, the cursor display means displays an animated picture which suggests an object or a living body resting in a constant position if the position assigning means has not assigned a new position for a set length of time. More specifically, the cursor display means displays an animated picture which suggests an object or a living body running, walking, swimming, or hovering in the same specific position if the position assigning means has not assigned a new position for a set length of time.

Further, the index picture display means is arranged to move the display position of the index picture in accordance with the position of cursor displayed by the cursor display means. Furthermore, the index display means fixedly displays the index picture at the specific position on the display screen. Furthermore, the index picture is displayed to allowed to move the index picture at the position corresponding to the position on the scale assigned by the reproduction starting position assigning means.

In addition, the reproducing position control means controls the running of the motion picture recording medium and fast forwards or rewinds the medium to allow movement to a recording position corresponding to the target reproduction image selected by the selection means to initiate a reproducing operation.

Further, at the present time, a pass position marker display means for displaying the marker showing the pass position which can playback from the motion picture recording medium is provided. Furthermore, the pass position marker display means displays the marker on the scale by superimposing. Furthermore, at the present time, the present position index picture display means is provided in which the present position index picture corresponding to the position which can reproduce from the motion picture recording medium is read from the index picture storage means and is displayed on the display screen.

Furthermore, the present position index picture display means displays the present position index picture next to the index picture corresponding to the reproduction starting position displayed by the index picture display means. Furthermore, a search condition display means for displaying the animated picture, which suggests an object or a living body moving from the display position of the present position index picture to the display position of the index picture corresponding to the reproduction starting position, is provided.

Furthermore, the search condition display means displays an animated picture which suggests an object or a living body running, walking, swimming, or flying from the display position of the present position index picture to the display position of the index picture corresponding to the reproduction starting position. In addition, the search condition display means displays an animated picture which suggests an object or a living body stopping in the same position when the present position index picture coincides with the index picture corresponding to the reproduction starting position.

Furthermore, when the present position index picture coincides with the index position corresponding to the reproduction starting position, an animated picture which suggests an object or a living body running, walking, swimming, or hovering in the same specific position is displayed.

Furthermore, an index picture generation means is provided which during the reproducing processing for reproducing motion pictures from the motion picture recording medium, reduces still images extracted at a certain preset time interval to an assigned number of pixels and sequentially generates a plurality of index pictures, each of which is then associated with a different recording position on the motion picture recording medium and written into the index picture storage means.

In addition, during the reproducing processing for reproducing motion pictures from the motion picture recording medium, the index picture generation means reduces still pictures extracted at a certain preset time interval to an assigned number of pixels, compresses them by a specified compression method, and sequentially generates a plurality of index pictures, each of which is then associated with a different recording position on the motion picture recording medium and written into the index picture storage means.

Furthermore, there is provided with an extraction timing assigning means which assigns an extraction timing for index pictures, so that in response to each assignment by the extraction timing assigning means during the reproducing processing for reproducing motion pictures from the motion picture recording medium, the index picture generation means generates a plurality of index pictures, associates each of the pictures with a different recording position on the motion picture recording medium, and writes these index pictures into the index picture storage means.

In addition, in the motion picture recording and reproducing apparatus of this invention which records a series of motion pictures on the motion picture recording medium in time sequence and reproduces motion pictures from the medium to display them on the display screen, the motion picture recording medium comprises an index picture generation means which during the recording processing for recording a series of motion pictures, extracts still pictures at a certain preset time interval and sequentially generates a plurality of index pictures, an index picture storage means which stores the index pictures sequentially generated by the index picture generation means by associating the pictures with respective recording positions on the motion picture recording medium, an index picture display means which arranges and displays the index pictures read from the index picture storage means on the display screen in time sequence, selection means which select a desired target reproduction picture to be reproduced from the index pictures arranged and displayed on the display screen, and reproducing position control means which move and control the reproducing start position of the motion picture recording medium to a recording position on the medium corresponding to the target reproduction picture selected by the selection means.

Furthermore, the index picture generation means includes an index picture generation means which during the recording processing for recording a series of motion pictures on the motion picture storage medium, extracts still pictures at a preset time interval to reduce them to an assigned number of pixels and sequentially generates a plurality of index pictures, each of which is then associated with a different recording position on the motion picture recording medium and written into the index picture storage means.

In addition, the index picture generation means includes an index picture generation means which during the recording processing for recording a series of motion pictures on the motion picture storage medium, extracts still pictures at a preset time interval to reduce them to an assigned number of pixels, compresses them by an assigned compression method, and sequentially generates a plurality of index pictures, each of which is then associated with a different recording position on the motion picture recording medium and written into the index picture storage means.

Furthermore, the extraction timing assigning means assigns an extraction timing for index pictures, and in response to each assignment by the extraction timing assigning means, the index picture generation means generates a plurality of index pictures, associates each of the pictures with a different recording position on the motion picture recording medium, and writes it into the index picture storage means. In addition, the extraction timing assigning means assigns an extraction timing for index pictures in connection to the operation of a recording start button.

The index picture storage means 33 stores a plurality of index pictures IDX extracted from a series of motion pictures in time sequence with an assigned extraction timing by associating the index pictures with respective storage positions on the motion picture recording medium, the index picture display means 25 arranges and displays the index pictures IDX read from the index picture storage means 33 on the display screen in time sequence, selection means select a desired target reproduction picture to be reproduced, and the reproducing position control means 22 and 34 allow movement to a recording position on the motion picture storage medium corresponding to the target reproduction picture to initiate a reproducing operation, thus allowing search conditions to be intuitively determined while searching storage data on the motion picture recording medium.

The index picture storage means 33 stores a plurality of index pictures IDX extracted from motion pictures in the motion picture recording medium with an assigned extraction timing by associating the index pictures with respective storage positions, assigns the desired reproduction starting position from the scale SK showing the recording area displayed on the display screen DSP, and displays the index picture IDG corresponding to the assigned position and moves to the recording position on the motion picture recording medium corresponding to the assigned position to initiate a reproducing operation. Thus, allowing search conditions to be visually and intuitively determined while searching storage data on the motion picture recording medium.

A controller of this invention comprises a columnar controlling member rotatably supported on a shaft provided roughly parallel to the lengthwise direction (a) of the operator's index finger 66a, and rotation detecting means which detect the rotation of said controlling member and output the results of detection S1 and S2 as controlling signals.

In the controller, the rotation detecting means detect the rotation angle and the rotation direction of said controlling member.

The controller also comprises click means which controls the rotational position of the controlling member at predetermined intervals.

The controller also comprises resetting means to reset the controlling member to the predetermined rotational position.

The controller also comprises click means which controls the rotational position of the controlling member at predetermined intervals, resetting means to reset the controlling member to the predetermined rotational position, and switching means to select either the click means or the resetting means.

In the controller, the controlling member is installed on the handle of the remote control to remotely control the picture regenerator.

In the controller, the controlling member is installed on the handle at one side of the display screen of the picture regenerator.

The controller controls the running conditions of the picture recording medium in the picture regenerator based on the controlling signals S1 and S2 from said rotation detecting means and.

The controller also comprises selected object displaying means which displays a predetermined selected region or a plurality of selected objects on a display screen and cursor displaying means which moves and displays a cursor along said selected region or selected objects, based on the controlling signals S1 and S2 output from the rotation detecting means.

A controller with quite easy operation can be realized by providing a shaft 4 of a columnar controlling member 5 roughly parallel to the lengthwise direction of the operator's index finger 6a, and by selectively switching the rotating conditions of the controlling member 5 to the click mode or center resetting mode.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 27A and 27B are graphs showing the results of detection by the rotation detecting device;

FIGS. 28A and 28B are graphs showing the results of detection by the rotation detecting device;

FIG. 29 is a front view showing the click mechanism of the roller device;

DETAILED DESCRIPTION OF THE EMBODIMENT

Preferred embodiments of this invention is described with reference to the accompanying drawings.

Figure 1A:
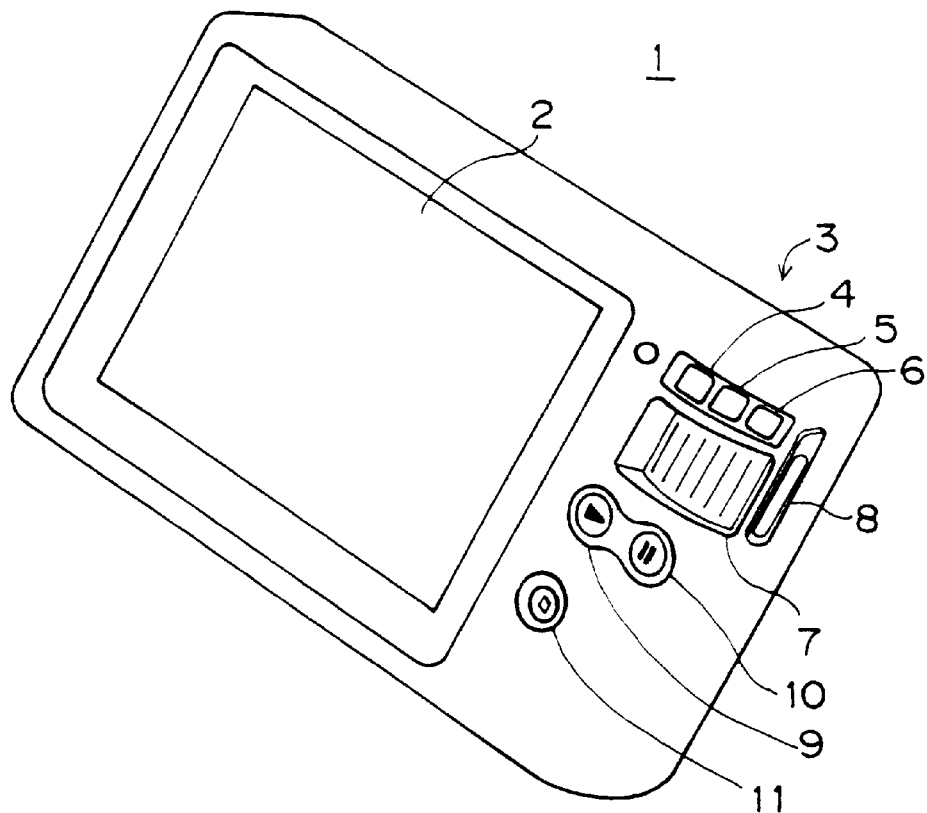
FIGS. 1A and 1B are perspective views showing an embodiment of a video tape recorder according to this invention.
Figure 1B:
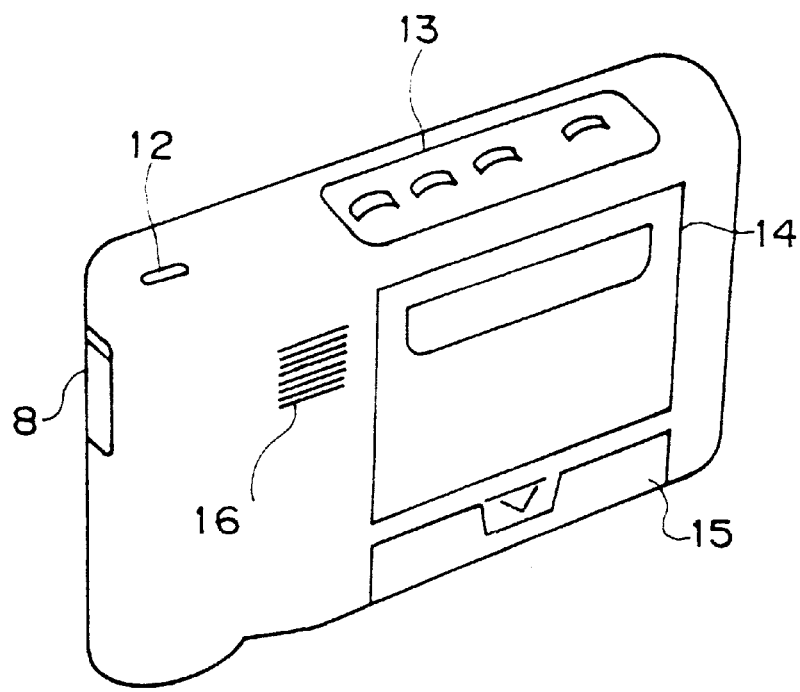

(1) First Embodiment
(1-1) Constitution of Video Tape Recorder According to the Embodiment In FIGS. 1A and 1B, 1 shows the exterior of a video tape recorder integrated on which a display screen is mounted. As shown in FIG. 1A, there is provided a color liquid crystal display 2 and a control part 3 on the front face. The control part 3 is provided with a global button 4, a view button 5, and a local button 6 as search control buttons, a roller 7 which performs various operations, a jog/shuttle switch 8 which switches the function of the roller 7, a "look" button 9 which controls the running of the magnetic tape, a pause button 10, and a stop button 11.

As shown in FIG. 1B, a power switch 12, sound volume and image quality control switches 13, a cassette tape opening 14, battery case 15, and a speaker 16 are located on the rear face of the video tape recorder 1. With this constitution, motion pictures recorded on the cassette tape can be projected and reproduced on the color liquid crystal display 2 by turning the power switch 12 on, inserting a cassette tape into the cassette tape opening 14, and then operating the "look" button 9, pause button 10, and stop button 11.

Information comprising RC time codes composed of prerecorded absolute time information, a tape ID for identifying a tape, and the total length of tape which represents the recording and reproduction time of the overall tape is additionally recorded to a magnetic cassette tape used in the video tape recorder 1. In addition, in this embodiment, an EEPROM added to, for example, a cassette tape case stores video indices generated by compressing pictures on the magnetic tape at an assigned timing and being combined with additional information.

Thus, with the video tape recorder 1, if a user operates one of the search control buttons, that is, the global button 4, view button 5, or local button 6 during, for example, reproducing, video indices can be used to display a global search picture, a view search picture, or a local search picture so that the user can execute a corresponding search operation by operating the roller 7. In addition, after search, the user can operate the "look" button 9 to fast forward or rewind the magnetic tape to the searched position in order to perform reproducing from that position.

Figure 2:
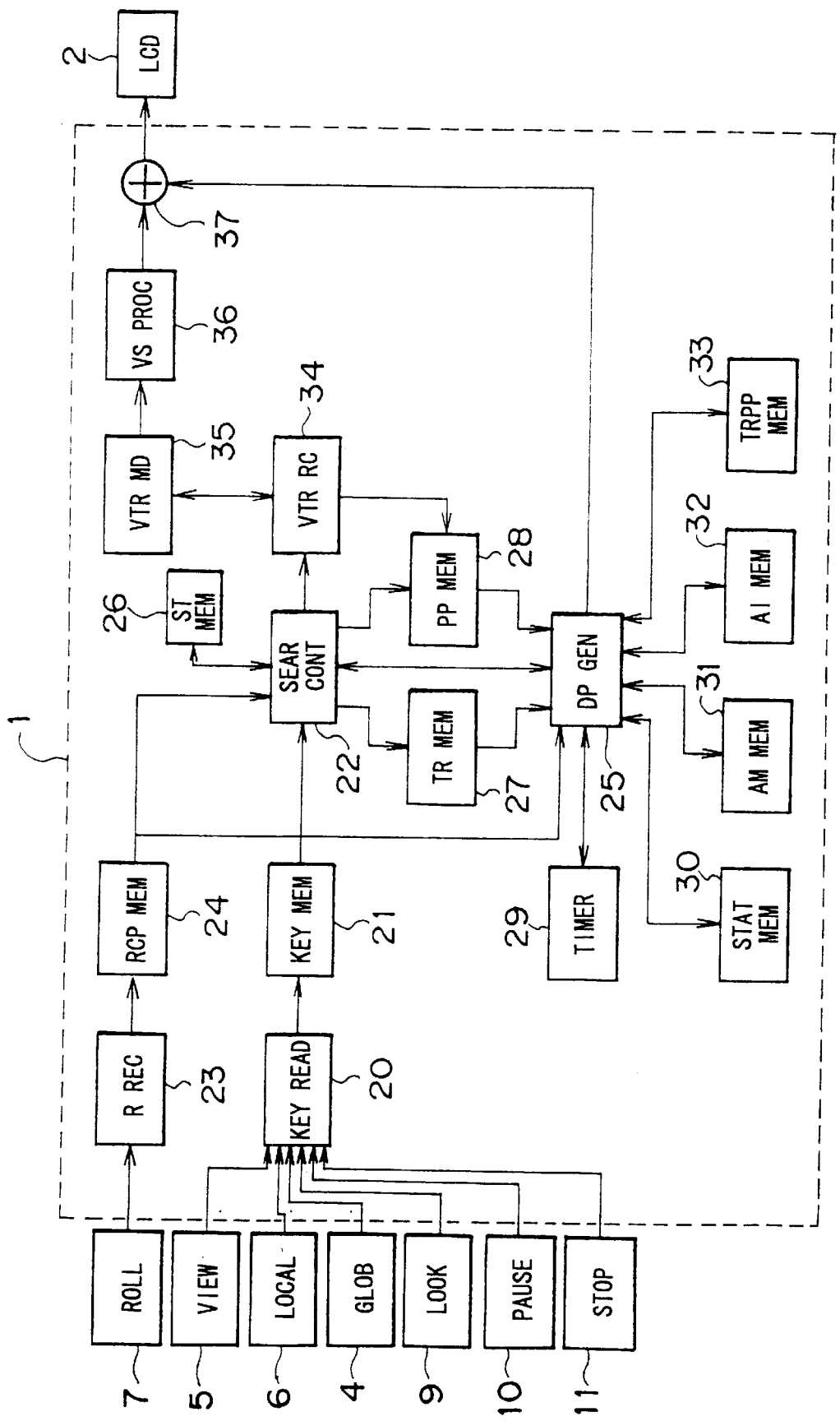
FIG. 2 is a block diagram illustrating the constitution of the video tape recorder in FIG. 1.

In order to execute such search, the video tape recorder 1 has the constitution shown in FIG. 2. That is, operational input information which represents states of the global button 4, view button 5, local button 6, "look" button 9, pause button 10, and stop button 11 is read by a key input read circuit 20 and stored in a key input memory 21. The key input contents stored in the key input memory 21 are sequentially read into a search control circuit 22 including, for example, a central processing unit (CPU). The search control circuit 22 performs a search operation corresponding to the key input.

In addition, the amount of rotation of the roller 7 is detected by a rotation detection circuit 23 and input to the search control circuit 22 and a display picture generating circuit 25 through a roller cursor position memory 24. The search control circuit 22 has a state memory 26 which records the processing state. The target playback position which is the target of search and the current playback position are input to the display picture generating circuit 25 through a target reproducing position memory 27 and a playback position memory 28, respectively.

The display picture generating circuit 25 includes a CPU as in the search control circuit 22, and also includes a timer 29 for controlling the display screen, a state memory 30 which stores the current processing state, an animation mode memory 31 which stores the mode of animation being displayed, an animation icon memory 32 which stores icons to be displayed on the screen, and a target reproduction position picture memory 33 which loads and stores video indices on the magnetic tape in advance.

Thus, during search, reproduced signals output from a VTR mechanical deck 35 which operates under the control of a VTR running control circuit 34 are processed by a video signal processing circuit 36 to generate motion picture signals which a picture composition circuit 37 superimposes on a display screen corresponding to a search display picture on the color liquid crystal display 2.

(1-2) Video Index Processing

Figure 3:
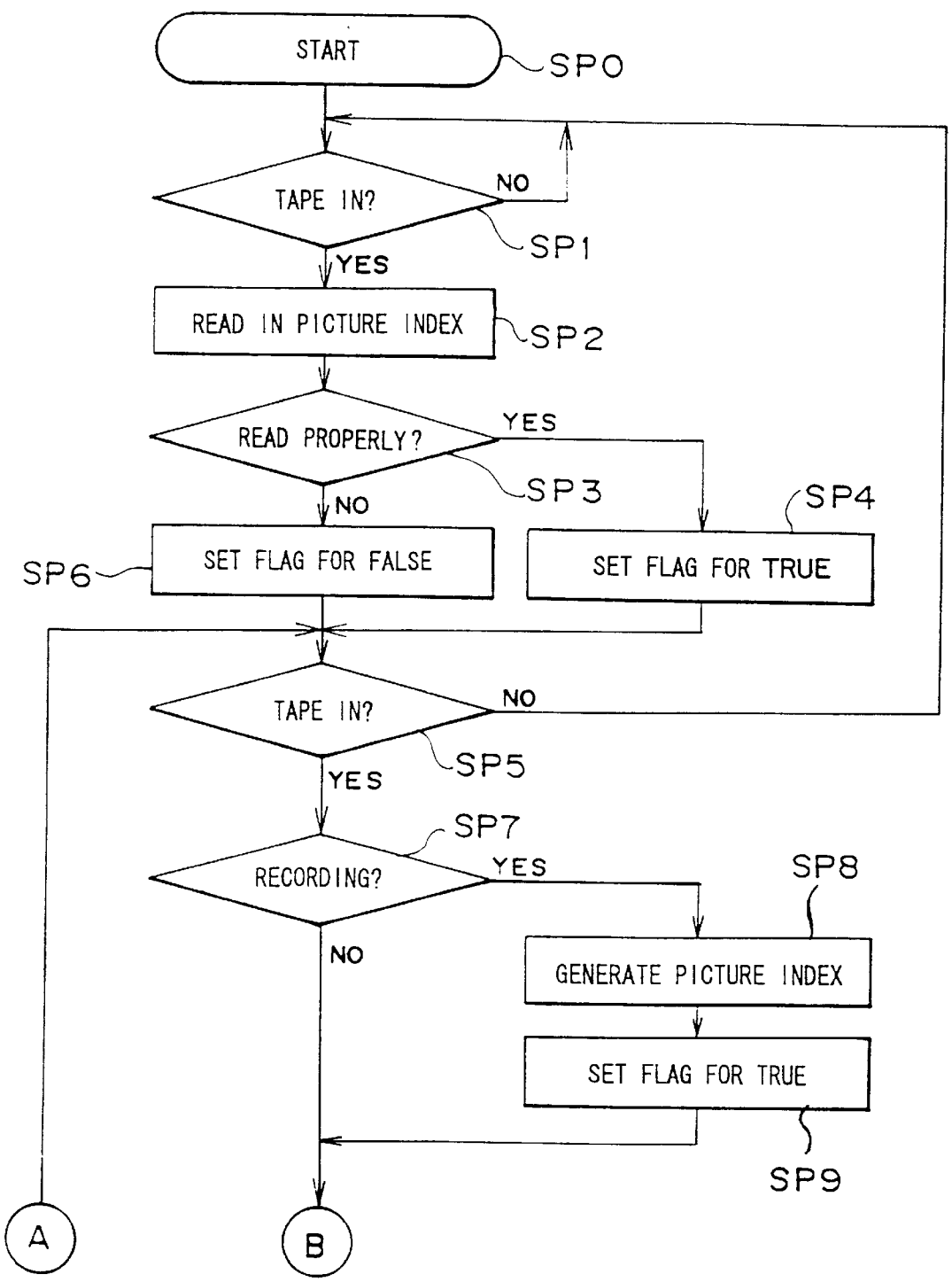
FIGS. 3 and 4 are flow charts describing the main processing procedure using picture indices in the video tape recorder of FIG. 1.
Figure 4:
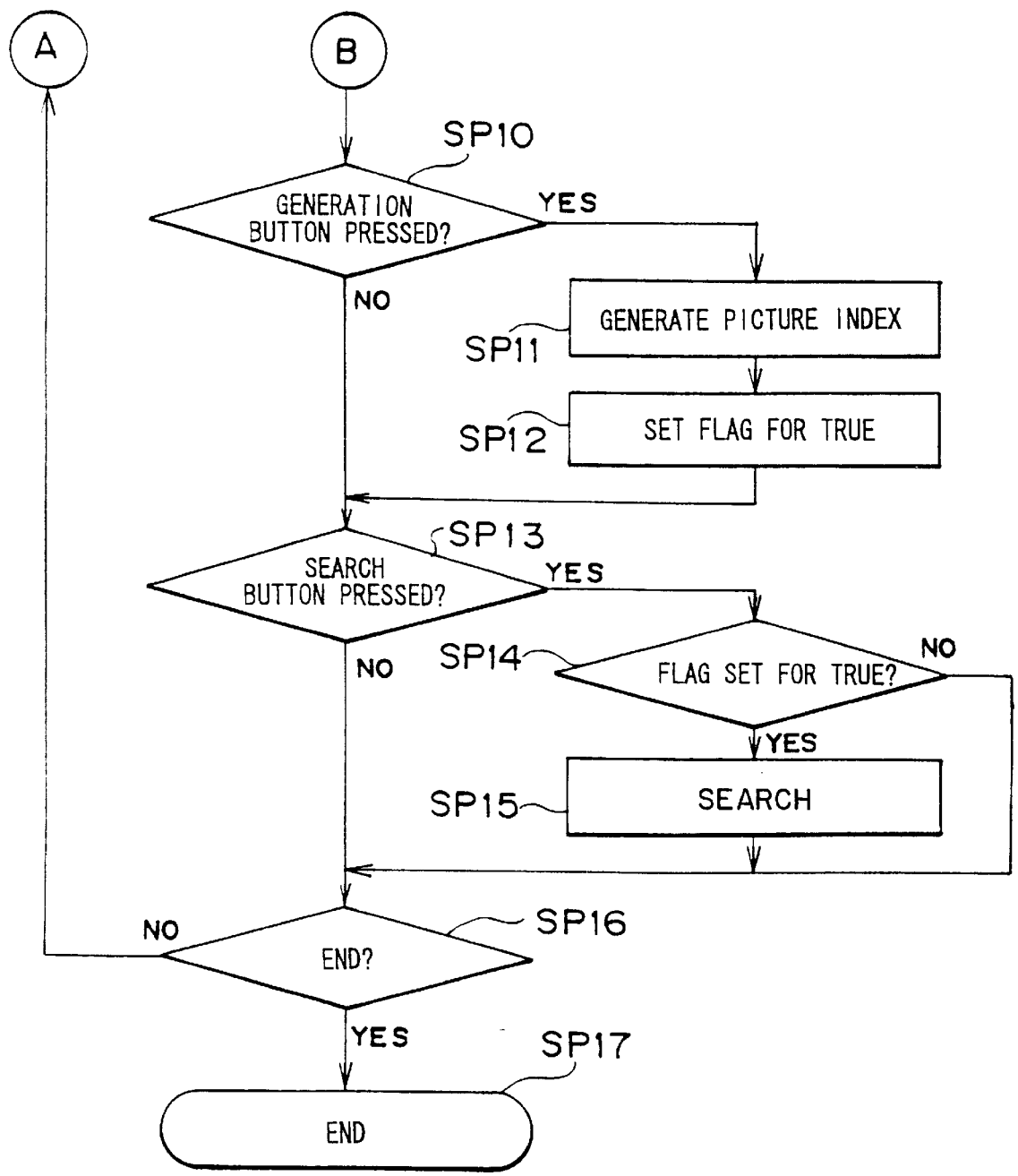

In the video tape recorder 1 of the embodiment, a system control circuit (not shown), which includes a CPU and controls the overall system, performs recording and reproducing in using picture indices by running an overall processing program SP0, as shown in FIGS. 3 and 4. The CPU in the system control circuit enters the overall processing procedure SP0, determines at step SP1 whether or not a cassette tape is in the recorder, and if not, waits for one to be inserted.

Then, at step SP2, the CPU reads picture indices from the memory provided in the cassette tape case and determines at step SP3 whether or not the read operation has been properly performed. If so, it runs step SP4 to set an internal FLAG for TRUE and proceeds to step SP5. If the read operation has not been conducted properly, the CPU runs step SP6 to set the FLAG for FALSE and proceeds to step SP5.

At step SP5, the CPU again determines whether or not a cassette tape is in the recorder and if not, returns to step SP1 and waits for a cassette tape to be inserted. If a cassette tape is found to be in the recorder, the CPU proceeds to step SP7 to determine whether or not the video tape recorder 1 is performing recording. If so, the CPU proceeds to step SP8 to generate indices for images being recorded, at SP9 sets the FLAG for TRUE, and then proceeds to step SP10. If the CPU determines at step SP7 that a cassette tape is not in the recorder, it proceeds directly to step SP10.

The CPU determines at step SP10 whether or not a picture index (VID) generation button (not shown) has been pressed. If so, it proceeds to step SP11 to generate indices for images, then sets the FLAG for TRUE at step SP12 and proceeds to SP13. If the CPU determines at step SP10 that the button has not been pressed, it proceeds directly to step SP13.

The CPU determines at step SP13 whether or not the global button 4, view button 5, or local button 6 has been pressed. If so, the CPU proceeds to step SP14 to determine whether or not the FLAG is set for TRUE, that is, whether image indices have been properly read or generated. If the CPU determines at step SP14 that the image indices have been properly read or generated, it performs a search operation corresponding to the operated button in step SP15, and then proceeds to step SP16.

In addition, if the results at steps SP13 and SP14 are negative, the CPU immediately proceeds to step SP16 to determine whether or not the stop button 11 which orders that the procedure be terminated has been pressed. If so, it stops the overall processing program SP0 at step SP17. However, if the stop button has not been pressed, the CPU returns to step SP5.

Figure 5:
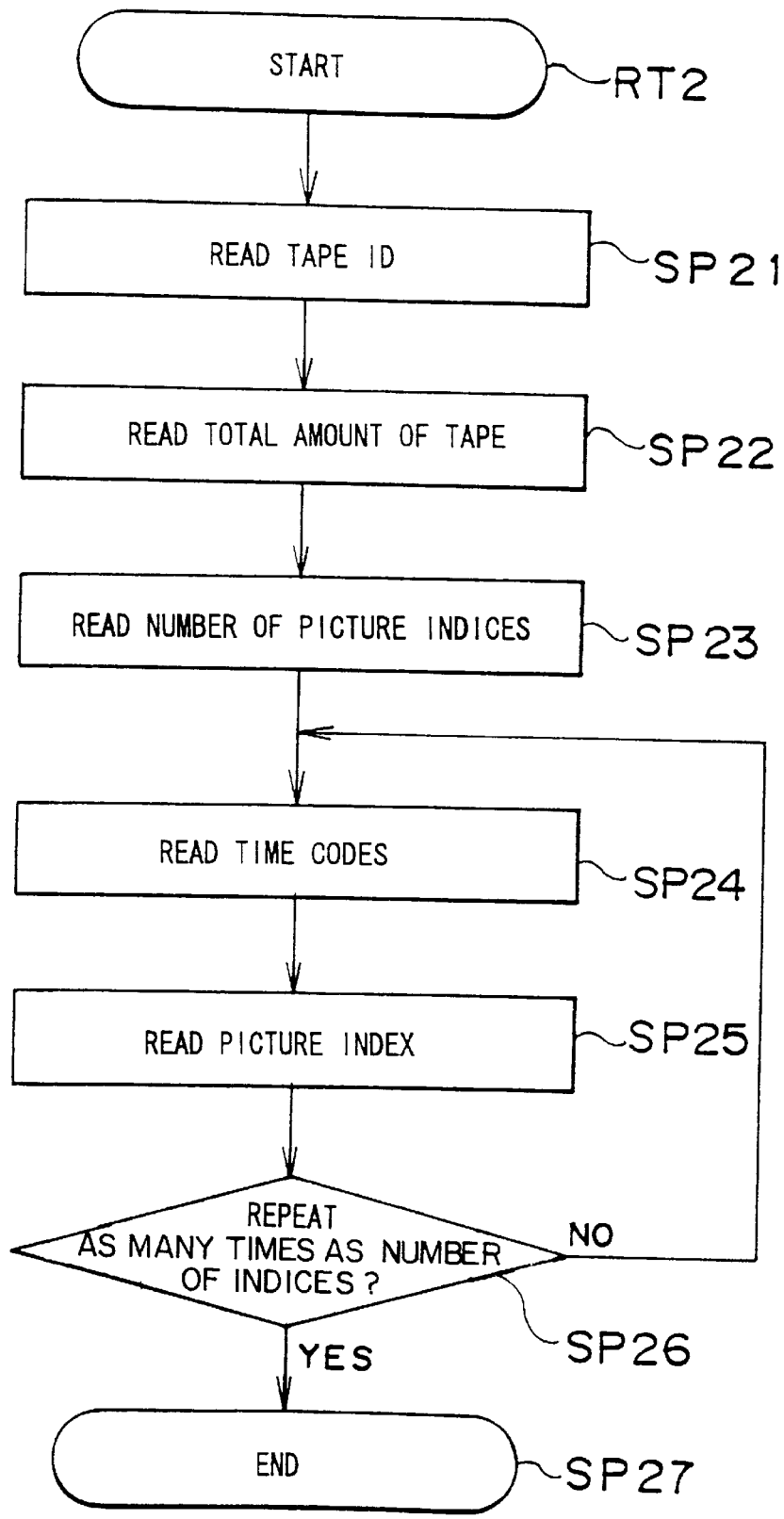
FIG. 5 is a flow chart describing an video index read procedure of FIGS. 3 and 4.

When the CPU reads video indices from the memory as described for step SP2, it executes a subroutine of a video index data read procedure RT2 shown in FIG. 5. This means that when the CPU reads video indices from the memory added to the cassette tape case, it enters the video index data read procedure RT2 and in the subsequent steps SP21 to SP23, reads the tape ID, the total amount of tape and the number of video indices into an internal memory.

Then, at steps SP24 and SP25, the CPU reads time codes and corresponding video indices into the internal memory and determines at step SP26 whether or not the read operation has repeated as times as the number of picture indices. If not, it repeats steps SP24 and SP25. Otherwise, it proceeds to step SP27 to terminate the video index data read procedure RT2.

Figure 6:
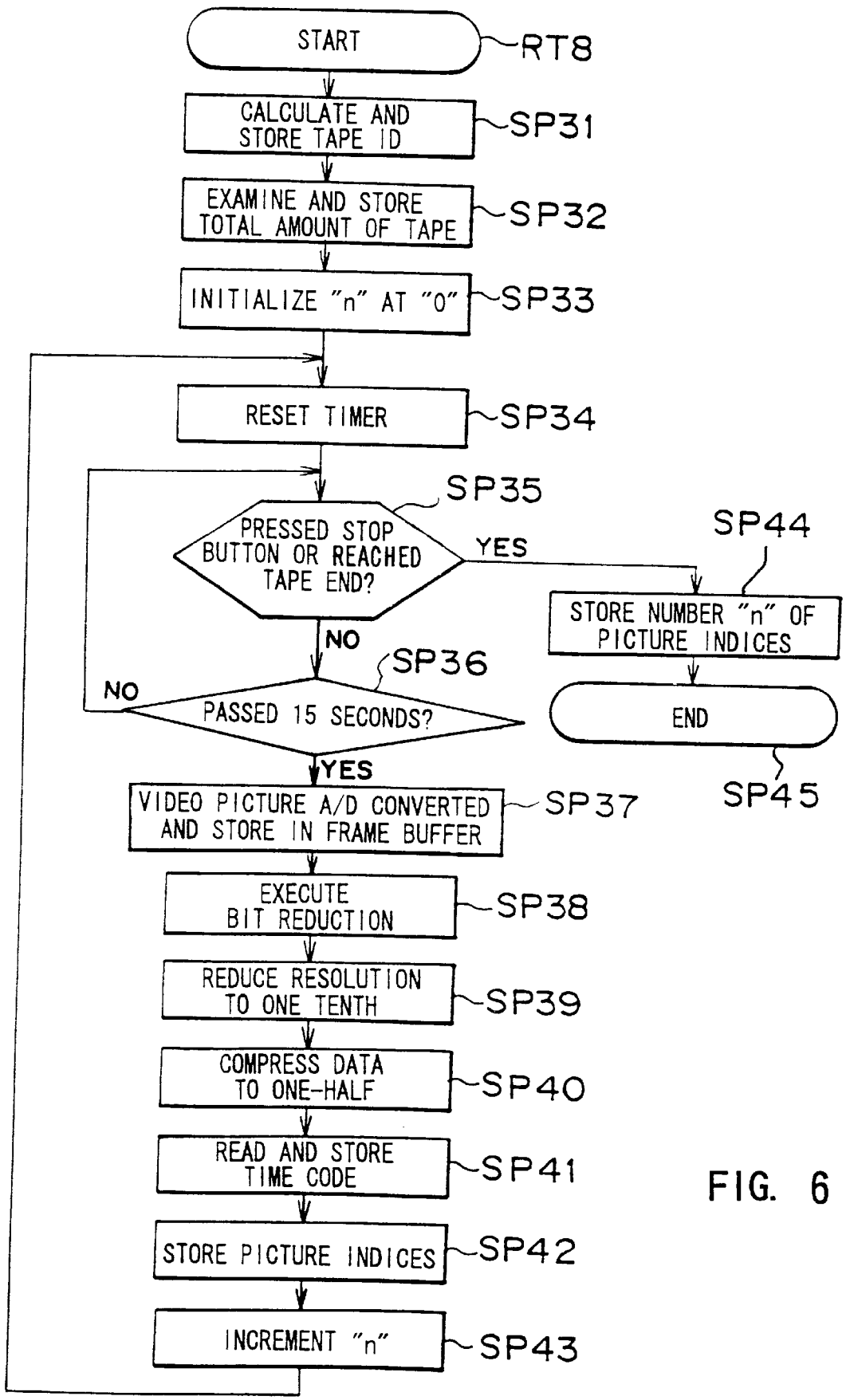
FIG. 6 is a flow chart describing a video index data generation procedure of FIGS. 3 and 4.

When the CPU generates indices for images as described for steps SP8 and SP11, it executes a subroutine of a video index data generation procedure RT8 shown in FIG. 6. This means that the CPU enters the picture index data generation procedure RT8 and at steps SP31 and SP32, calculates and stores the tape ID, examines and stores the total amount of tape based on the rotational frequency, and next initializes a counter n at 0 at step SP33.

Then, at step SP34, the CPU resets a timer 29 which indicates the time interval at which picture indices are taken into. The CPU determines at step SP35 whether or not the stop button 11 has been pressed or the end of the tape has been reached. If not, it proceeds to step SP36 to determine whether or not the timer 29 has indicated the passage of 15 seconds and if it has not, the CPU proceeds to step SP35.

Figure 7A:
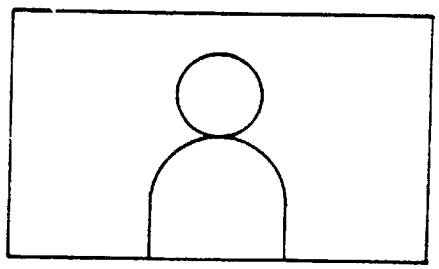
FIGS. 7A to 7E are schematic diagrams describing the video index data generation procedure of FIG. 6.
Figure 7B:
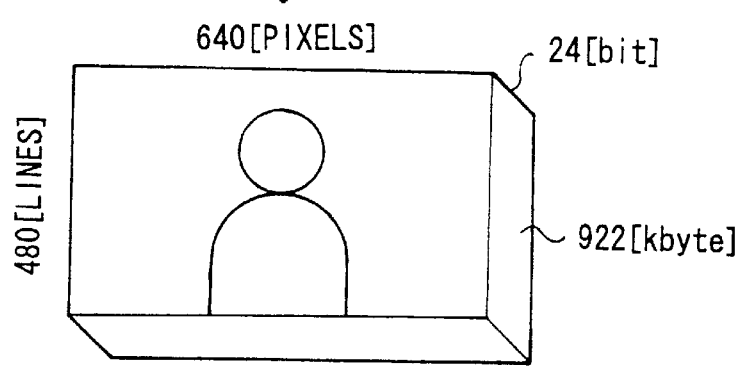

When the result is positive at SP36 because the timer 29 has indicated the passage of 15 seconds, the CPU proceeds to step SP37 to execute an analog to digital conversion for a video signal comprising a video picture shown in FIG. 7A which is stored in a frame buffer. At this point, each single pixel data in a video picture of 640 pixels×480 lines is expressed by 24 bits, and thus a single video picture contains about 922 kbytes (=640 pixels*480 lines*24 bits) of data, as shown in FIG. 7B.

Figure 7C:
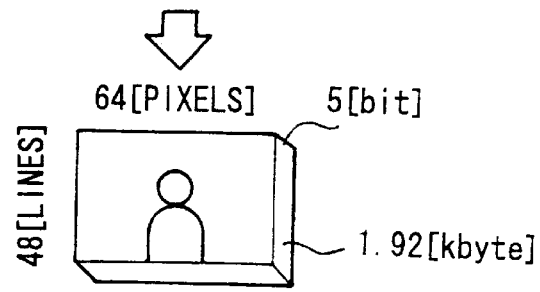

The CPU then proceeds steps SP38 and SP39 successively. In bit reduction processing, the pixel data size is reduced from 24 bits to 5 bits. The picture data is also reduced from 640 pixels×480 lines to 64 pixels×48 lines, reducing resolution to one tenth. This results in about 1.92 kbytes of data for a single picture, as shown in FIG. 7C.

Figure 7D:
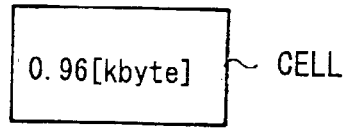

The CPU runs step SP40 to reduce the approximately 1.92 kbytes of data to one-half using the run length coding in order to generate a picture index cell composed of 0.96 kbytes of data for a single picture, as shown in FIG. 7D.

Figure 7E:
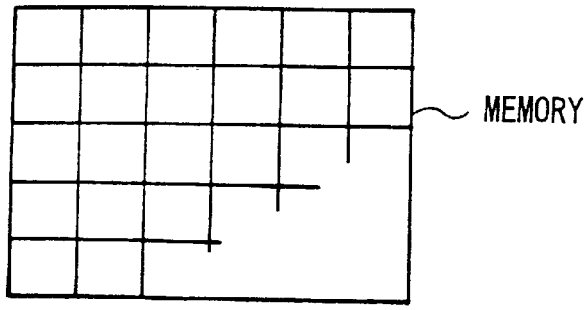

The CPU proceeds to steps SP41 and SP42 successively to read a time code corresponding to the picture index cell generated as described above and the time code and cell are sequentially stored in a memory as picture indices, as shown in FIG. 7E. In actuary, if the total length of the magnetic tape is 120 minutes and picture indices are generated at a 15 seconds interval as described above, the total quantity of the resultant data becomes 463 kbytes, as shown in the following expression:

$$964 \ [\text{byte}] \times \frac{120 \times 60}{15} = 463 \ [\text{kbyte}] \quad (1)$$

The CPU also increments the counter n at step 43 and proceeds to step SP34, described above, to generate a picture index for the next picture. In addition, if the result is positive at step SP35, that is, the stop button 11 has been pressed or the end of tape has been reached, the CPU proceeds to step SP44 to store the value of the counter n as the number of the picture index and at step SP45, ends the picture index data generation procedure RT8.

Figure 8:
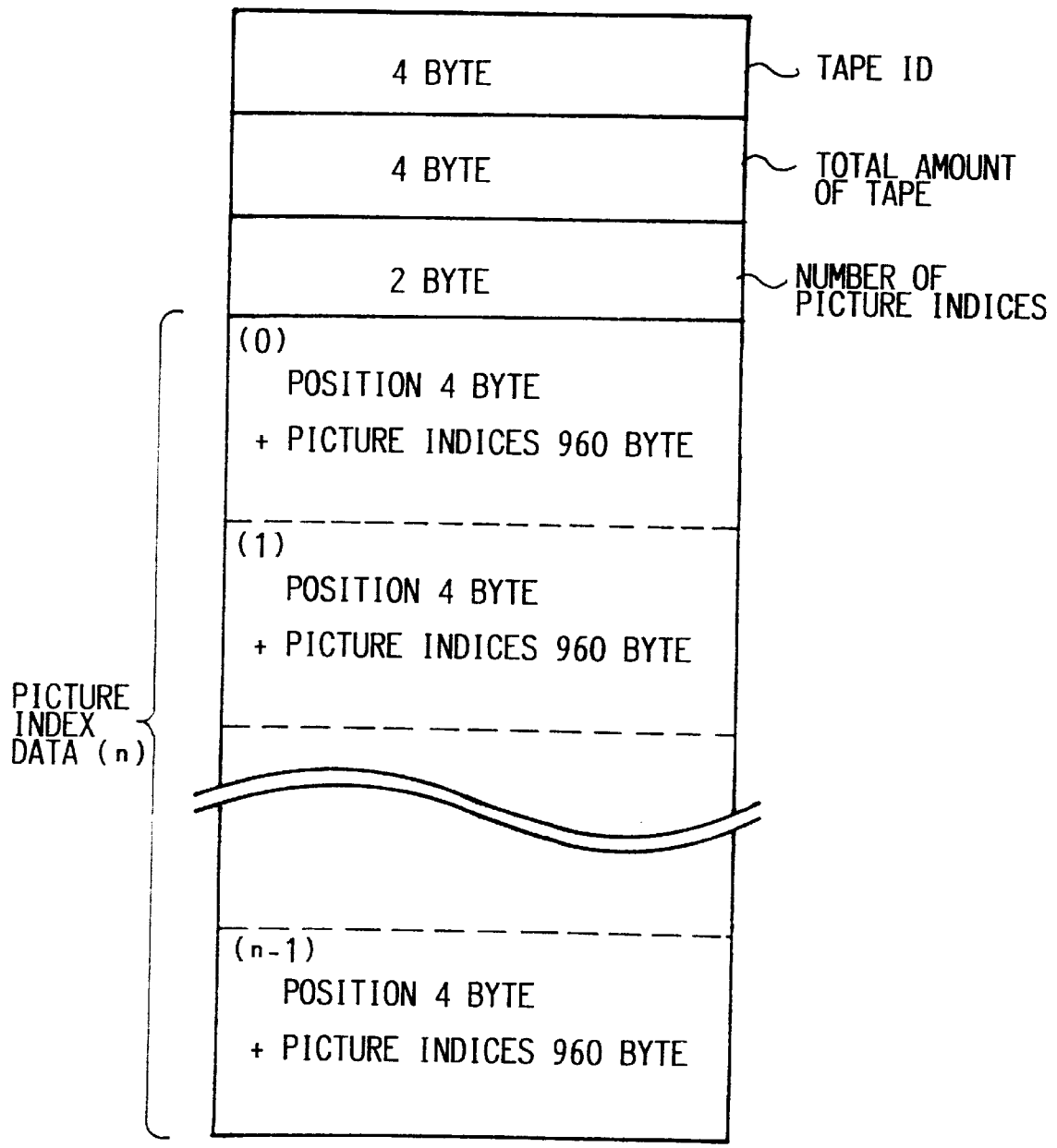
FIG. 8 is a schematic diagram illustrating a memory map for picture index data generated by the picture index data generation procedure of FIG. 6.

Picture indices in the actual memory are stored according to a memory map shown in FIG. 8. That is, the first four bytes from the beginning of memory contain a tape ID, the next four bytes contain the total amount of tape, and the next two bytes contain the number of picture indices. This is followed by "n" (=0, 1, 2, . . . n−1) pieces of data, each composed of a four-byte time code which expresses a position on the magnetic tape and a 960-byte picture index, wherein (n) is the number of picture indices, thus becoming to generate picture indices.

(1-3) View Search Processing

Figure 9:
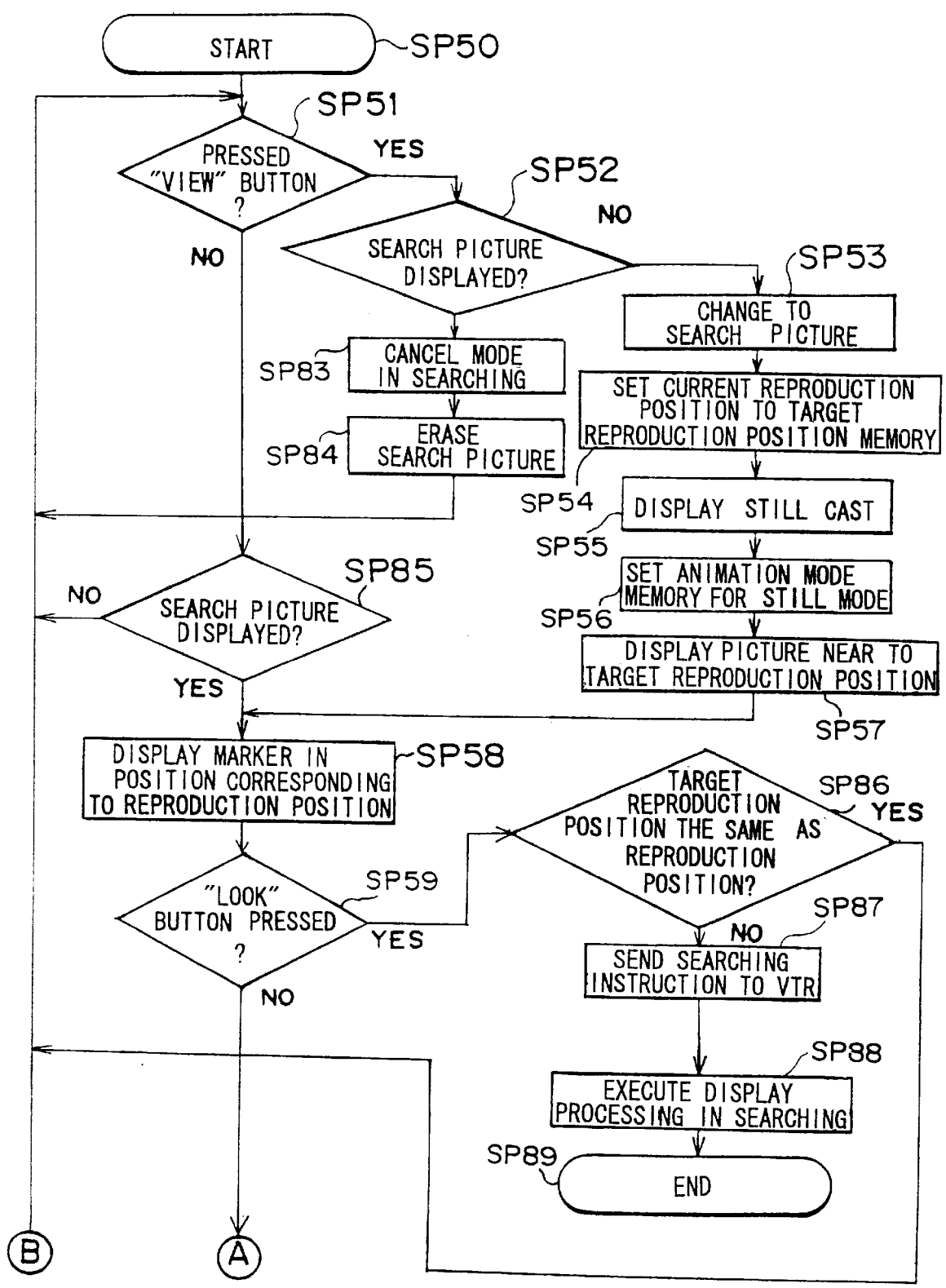
FIGS. 9 and 10 are flow charts describing a view search procedure.
Figure 10:
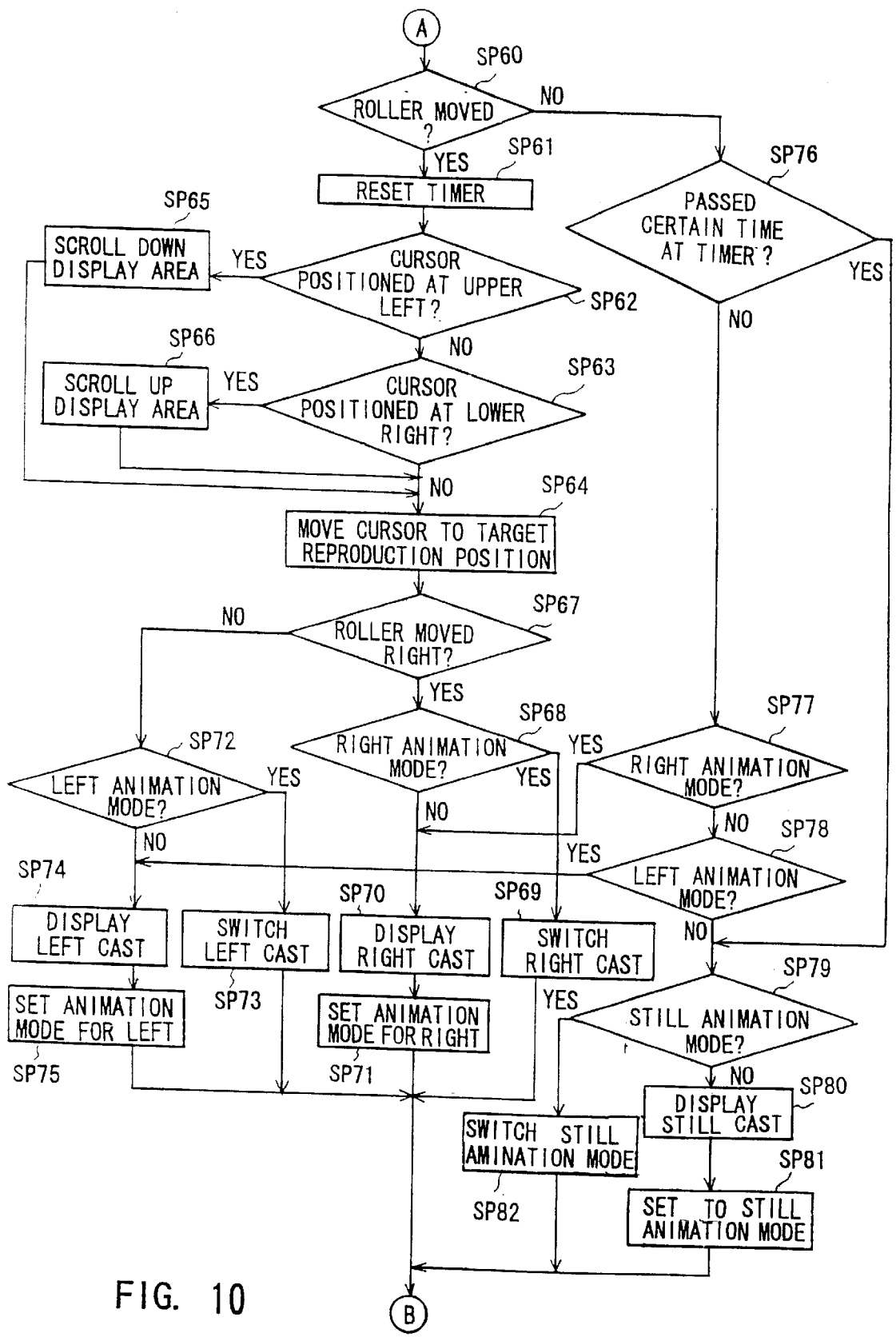

When the view button 5 is pressed, the CPU for the search control circuit 22 and the display picture generation circuit 25 in the video tape recorder 1 executes a view search processing procedure SP50 using picture indices IDX, as shown in FIGS. 9 and 10, as a search operation for steps SP13 to SP15 within the main processing routine SP0 (FIGS. 3 and 4).

Figure 11:
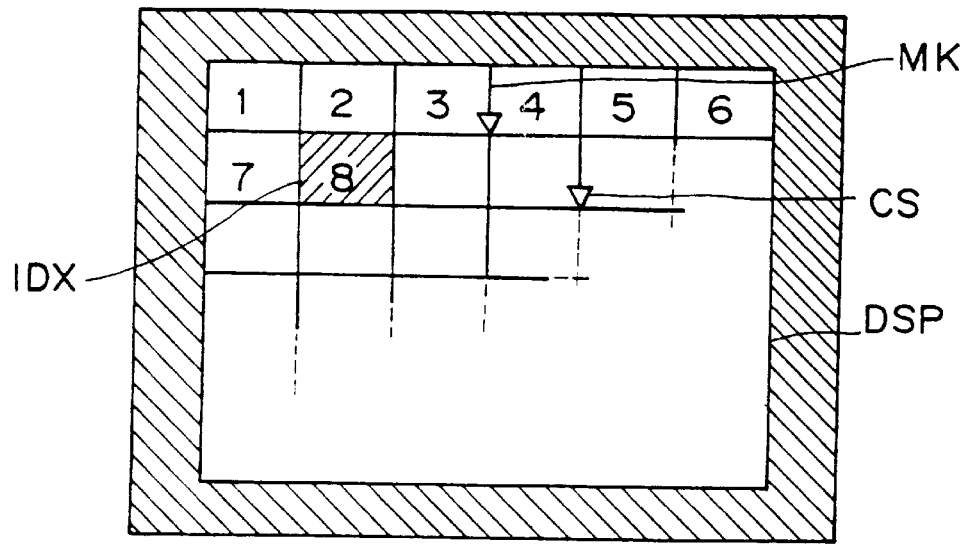
FIG. 11 is a schematic diagram describing a screen configuration during the view search procedure of FIGS. 9 and 10.

During view search, an assigned number of picture indices IDX are arranged and displayed on the display screen DSP in time sequence as matrices around the reproducing position on the magnetic tape which is currently contacted by the magnetic head, and the cursor CS indicates the target reproduction position, the as shown in FIG. 11.

In this case, cell images for picture indices IDX are put in lines oriented from left to right and the lines are arranged from top to bottom in the sequence of the corresponding time codes. The marker MK indicating a reproduction position and the cursor CS expressed as an animated figure, for example, a moving character, and indicating the target reproduction position are displayed on the display screen DSP.

When the cursor CS reaches the left end of the display screen DSP, it moves up one line and when it reaches the right end, it moves down one line. In addition, when the cursor CS reaches the upper left end of the display screen DSP, all the picture indices IDX within the display screen DSP are scrolled up one line and when it reaches the lower right end, all the video indices IDX are scrolled down one line.

In actuality, the CPU for the search control circuit 22 and the display screen generation circuit 25 enters a view search procedure SP50 and determines at step SP51 whether or not the view button 5 has been pressed. If so, it proceeds to step SP52 and determines whether or not a search picture has been displayed. In a first search, the result is negative and the CPU proceeds to step SP53.

At step SP53, the CPU switches the reproduced picture displayed on the color liquid crystal display 2 to a search picture composed of the view search display screen DSP described for FIG. 11 and at step SP54, sets the current reproduction position in the target reproduction position memory 27. The CPU then reads one of still casts shown in FIGS. 12E to 12F from the animation icon memory 32 and displays it as the cursor CS. In addition, the CPU then performs step SP56 to set the animation mode memory 31 for still animation mode which enters still state.

Then, at step SP57, the CPU reads picture indices near the target reproduction position IDX from the target reproducing picture memory 33 based on the contents of the target picture position memory 27 and arranges and displays them on the display screen DSP in time sequence as matrices. At step SP58, it displays the marker MK in a position corresponding to the reproduction position and proceeds to step SP59.

The CPU determines at step SP59 whether or not the "look" button 9 has been pressed. Ordinarily, pressing the view button 5 and subsequently pressing the "look" button 9 during view search causes search to be ended and the magnetic tape to be rewound to its beginning. In ordinary search, the result is negative at step SP59 and the CPU proceeds to step SP60.

The CPU determines at step SP60 whether or not the roller 7 has moved based on rotation information for the roller 7 input from the roller cursor position memory 24. If the result is affirmative, it proceeds to step SP61 to set the timer 29 for switching the display of casts even if the roller 7 has not moved and, then proceeds to step SP62.

The CPU determines at step SP62 whether or not the cursor CS is positioned at the upper left end of the display screen DSP. If not, it proceeds to step SP63 to determine whether or not the cursor CS is positioned at the lower right end of the display screen DSP. If not, it proceeds to step SP64.

If the result is affirmative at step SP62, the CPU proceeds to step SP65 to scroll down the display area and then proceeds to step SP64. If the result is affirmative at step SP63, it proceeds to step SP66 to scroll up the display area and then proceeds to step SP64.

At step SP64, the CPU moves the cursor CS to the target reproduction position and determines at step SP67 whether or not the roller 7 has moved to the right. If so, the CPU proceeds to step SP68 to reference the animation mode memory 31 to determine whether or not the current animation mode is right. If so, it proceeds to step SP69 to switch the right cast (FIGS. 12C or 12D) displayed as a cursor CS and then returns to step SP51.

In addition, if the result is negative at step SP68, the CPU proceeds to step SP70 to display a right cast (FIGS. 12C or 12D) instead of the cast currently displayed and to set the animation mode memory 31 to right animation mode at step SP71. The CPU then returns to step SP51.

Further, if the result is negative at step SP67, the CPU proceeds to step SP72 to reference the animation mode memory 31 to determine whether or not the current animation mode is left. If so, it proceeds to step SP73 to switch the left cast (FIGS. 12A or 12B) displayed as a cursor CS and then returns to step SP51.

In addition, if the result is negative at step SP72, the CPU proceeds to step SP74 to display a left cast (FIGS. 12A or 12B) instead of the cast currently displayed and to set the animation mode memory 31 to left animation mode at step SP75. The CPU then returns to step SP51.

If the result is negative at step SP60, the CPU proceeds to step SP76 to determine whether or not the timer indicates that a certain time has passed. If not, it proceeds to step SP77 to determine whether or not the current animation mode is right. If so, the CPU proceeds to step SP70 to display a right cast (FIGS. 12C or 12D) instead of the cast currently displayed and to set the animation mode memory 31 to right animation mode. The CPU then returns to step SP51.

In addition, if the result is negative at step SP77, the CPU proceeds to step SP78 to determine whether or not the current animation mode is left. If so, it proceeds to step SP74 to substitute a left cast (FIGS. 12A or 12B) for the cast currently displayed and to set the animation mode memory 31 to left animation mode. The CPU then returns to step SP51.

Further, if the result is negative at step SP78 and affirmative at step SP76, the CPU proceeds to step SP79 to determine whether or not the current animation mode is still. If not, it proceeds to step SP80 to substitute a still cast (FIGS. 12E or 12F) for the cast currently displayed and to set the animation mode memory 31 to still animation mode at step SP81. It then returns to step SP51. In addition, if the result is positive at step SP79, it proceeds to step SP82 to switch the still cast (FIGS. 12E or 12F) displayed as a cursor CS and then returns to step SP51.

When the CPU returns to step SP51, it again determines whether or not the view button 5 has been pressed. If so, it proceeds to step SP52 to determine whether or not a search picture has been displayed. In a second search, the result is positive at this point and the CPU proceeds to step SP83 to cancel the mode in searching and at step SP84, erases the search screen to return to step SP51. If the result is negative at step SP51, the CPU proceeds to step SP85 to determine whether or not a search picture has been displayed. If not, it returns to step SP51.

In fact, when the above processing is performed, the view button 5 is used as a toggle switch. Pressing the view button 5 once displays the view search picture and actuates a mode which enables search. Pressing the button 5 again during this state erases the view search picture and suspends search. Pressing the view button 5 again displays the view search picture and actuates a mode which enables search.

In addition, if the result is affirmative at step SP85, the CPU again performs a processing loop of steps SP58 to SP82. If the result is affirmative at step SP59, the CPU proceeds to step SP86 to determine whether or not the target reproduction position is the same as the reproduction position. If so, it returns to step SP51. The said determination step is required to determine whether or not actual search must be performed by fast forwarding or rewinding the magnetic tape because the target reproduction position, the result of view search processing, is different from the current reproduction position.

Therefore, if the result is negative at step SP86, the CPU proceeds to step SP87 and sends a searching instruction to the VTR running control circuit 28, ordering that the magnetic tape be moved to a frame assigned by a time code added to a picture index IDX containing the target reproduction position. Then, at step SP88, the CPU executes processing required to indicate that search is being performed. At step SP89, it terminates the view search program SP50.

With the above constitution, if the user presses the view button 5 while the video tape recorder 1 is performing reproduction, picture indices IDX near the reproduction position are displayed on the display screen DSP of the color liquid crystal display 2 as matrices. Thus, when the user moves the roller 7 around, the cursor CS indicating a target reproduction position on the display screen DSP moves in response to the rotation of the roller 7.

Therefore, if the user presses the "look" button 9 after a target reproduction position is determined, a new picture is displayed indicating that search is being performed. Once search is terminated, reproduction is started from the target reproduction position and a corresponding picture is displayed. Thus, with this video tape recorder 1, picture indices IDX on the display screen DSP can be referenced to visually and intuitively search the target reproduction position, resulting in substantially improved user-friendliness in search.

(1-4) Local Search Processing

Figure 13:
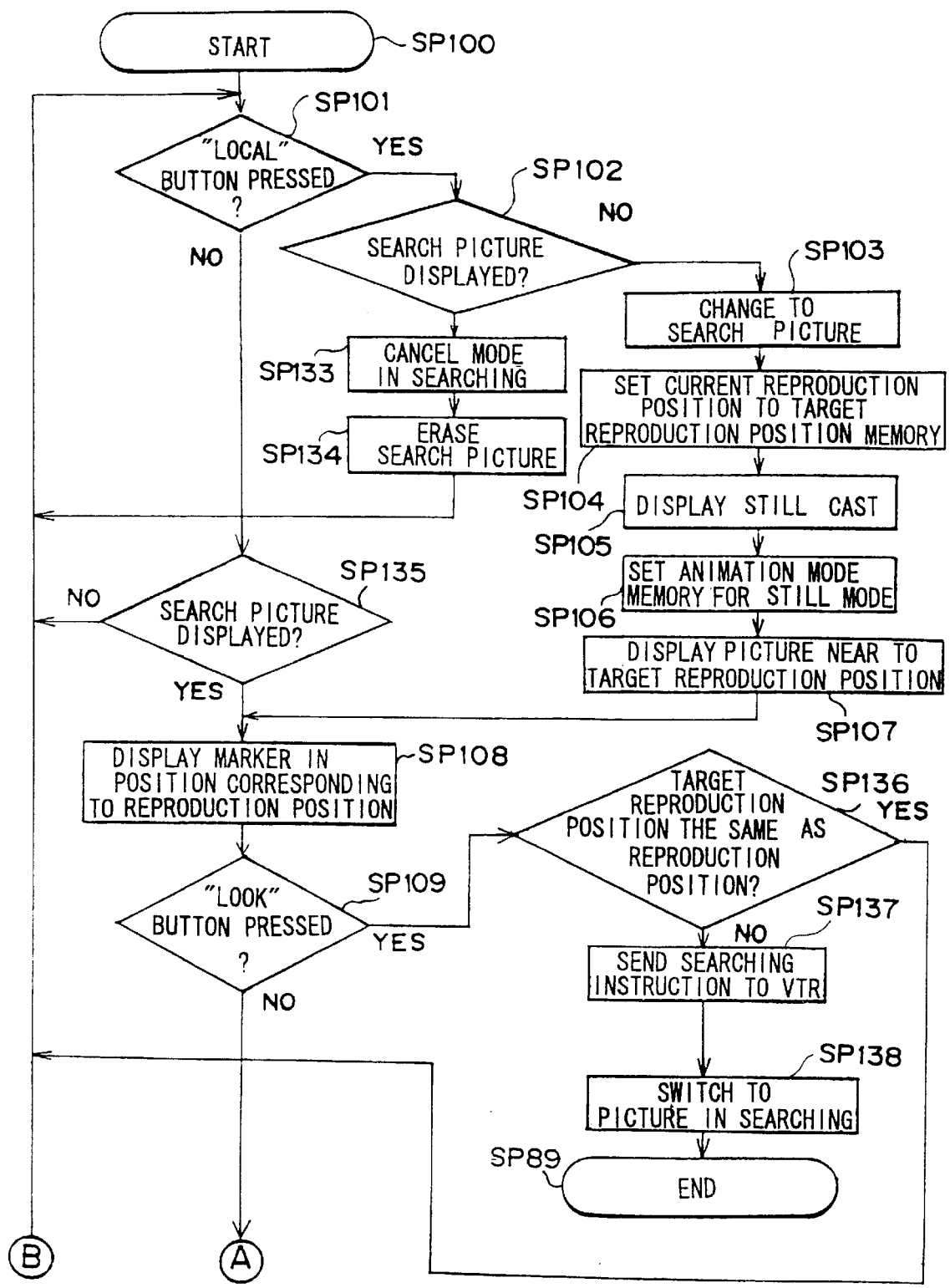
FIGS. 13 and 14 are schematic diagrams describing a local search procedure.
Figure 14:
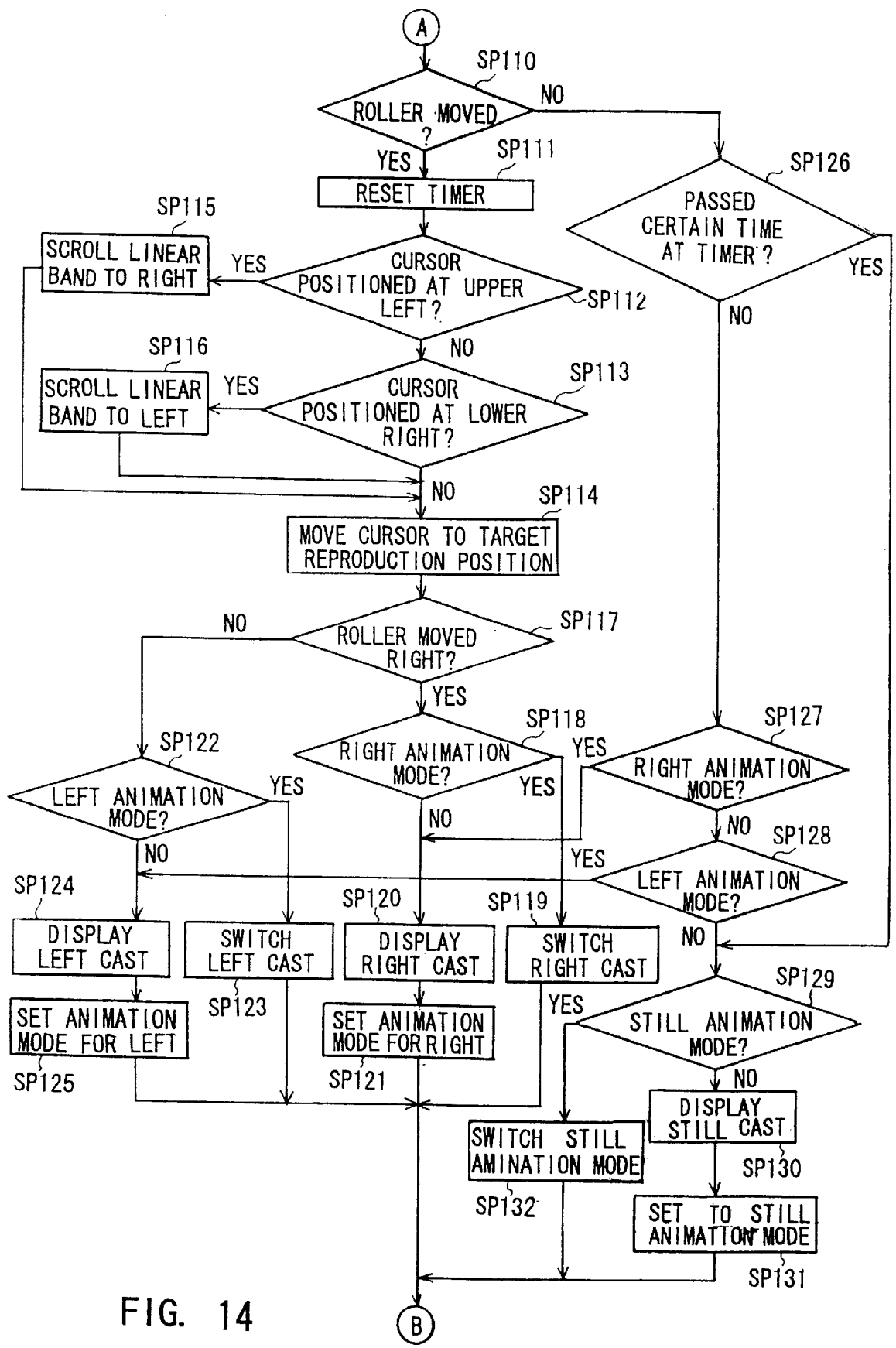

When the local button 6 is pressed, the CPU for the search control circuit 22 and the display picture generating circuit 25 in the video tape recorder 1 according to this embodiment executes a local search program SP100 shown in FIGS. 13 and 14 as a search operation for steps SP13 to SP15 within the main processing program SP0 (FIGS. 3 and 4) using picture indices IDX.

Figure 15:
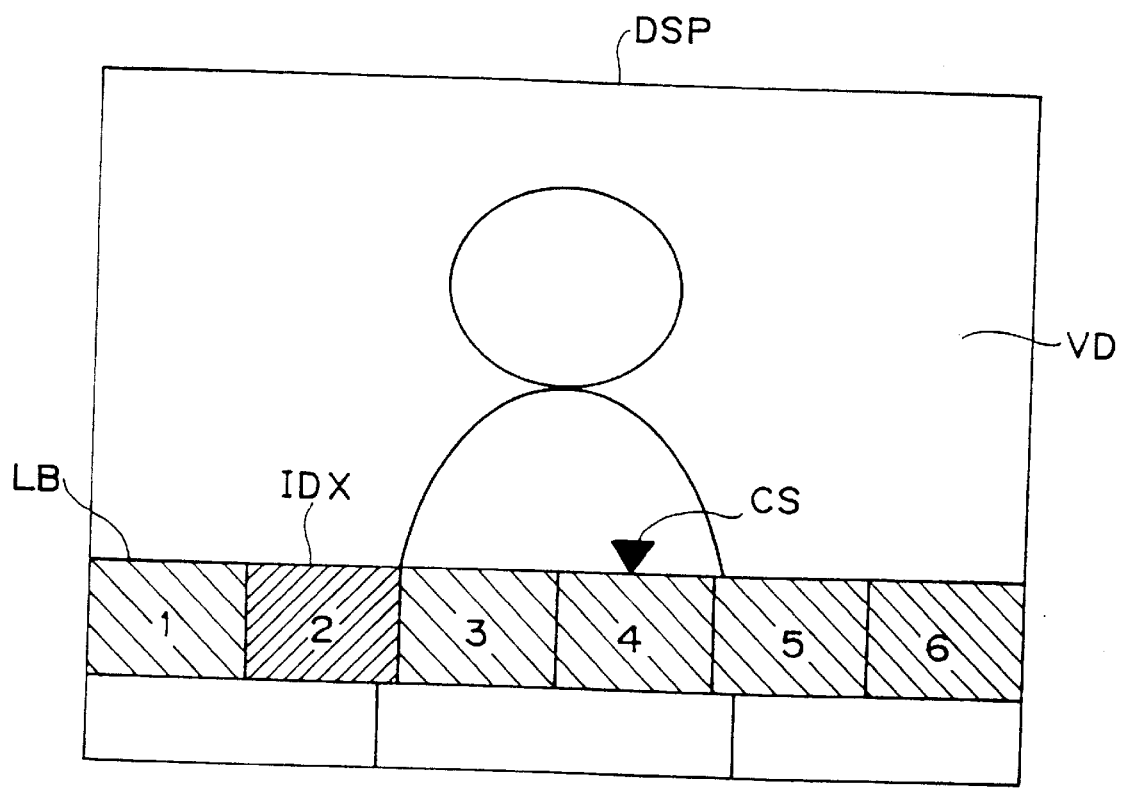
FIG. 15 is a schematic diagram describing a screen configuration during the local search procedure of FIGS. 13 and 14.

During local search, an assigned number of picture indices IDX, displayed as a linear band LB, are superimposed on a video image VD displayed on the display screen DSP in time sequence around the reproduction position on the magnetic tape which is currently contacted by the magnetic head, and the cursor CS indicates the target reproduction position, as shown in FIG. 15.

In this case, cell images for picture indices are put from left to right in the sequence of the corresponding time codes. The marker MK indicating a reproduction position and the cursor CS, expressed as an animated figure, for example, a moving character, and indicating a target reproduction position are displayed on the linear band LB. When the cursor CS reaches the left end of the linear band LB, the band LB is scrolled one picture index IDX cell to the right and when it reaches the right end, the band LB is scrolled one picture index IDX cell to the left.

In fact, the CPU for the search control circuit 22 and the display picture generating circuit 25 enters the local search program SP100 and determines at step SP101 whether or not the local button 6 has been pressed. If so, the CPU proceeds to step SP102 and determines whether or not a search picture has been displayed. In a first search, the result is negative at this point and the CPU proceeds to step SP103.

Figure 12A:
FIGS. 12A to 12F are schematic diagrams illustrating moving casts displayed over the cursor.
Figure 12B:

At step SP103, the CPU switches the reproducing picture displayed on the color liquid crystal display 2 to a search picture composed of the view search display screen DSP described for FIG. 15. At step SP104, it sets the current reproduction position in the target reproduction position memory 27. The CPU then reads a still cast, as shown in FIGS. 12E or 12F, from the animation icon memory 32 and displays it as a cursor CS. The CPU then performs step SP106 to set the animation mode memory 31 for still animation mode which enters the still state.

Next, at step SP107, the CPU reads picture indices IDX near the target reproduction position from the target repro-duction picture memory 33 based on the contents of the target picture position memory 27 and arranges and displays a linear band LB on the display screen DSP in time sequence. At step SP108, it displays the marker MK in a position corresponding to the reproduction position and proceeds to step SP109.

The CPU determines at step SP109 whether or not the "look" button 9 has been pressed. Ordinarily, pressing the local button 6 and subsequently pressing the "look" button 9 during local search causes search to be terminated and the magnetic tape to be rewound to its beginning. In ordinary search, the result is negative at step SP109 and the CPU proceeds to step SP110.

The CPU determines at step SP110 whether or not the roller 7 has moved based on rotation information for the roller 7 input from the roller cursor position memory 24. If the result is negative at this point, it proceeds to step SP111 to reset the timer 29 for switching the display of casts even if the roller 7 has not moved and then proceeds to step SP112.

The CPU determines at step SP112 whether or not the cursor CS is positioned at the left end of the linear band LB. If not, it runs step SP113 to determine whether or not the cursor CS is positioned at the right end of the reflection band LB. If not, it proceeds to step SP114.

If the result is affirmative at step SP112, the CPU proceeds to step SP115 to scroll the linear band LB to the right and then proceeds to step SP114. If the result is affirmative at step SP113, it proceeds to step SP116 to scroll the linear band LB to the left and then proceeds to step SP114.

At step SP114, the CPU moves the cursor CS to the target reproduction position and determines at step SP117 whether or not the roller 7 has moved to the right. If so, the CPU proceeds to step SP118 to reference the animation mode memory 31 to determine whether or not the current animation mode is right. If so, it proceeds to step SP119 to switch the right cast (FIGS. 12C or 12D) displayed as a cursor CS and then returns to step SP101.

In addition, if the result is negative at step SP118, the CPU proceeds to step SP120 to substitute a right cast (FIGS. 12C or 12D) for the cast currently displayed and to set the animation mode memory 31 to right animation mode. The CPU then returns to step SP101.

Further, if the result is negative at step SP117, the CPU proceeds to step SP122 to reference the animation mode memory 31 to determine whether or not the current animation mode is left. If so, it proceeds to step SP123 to switch the left cast (FIGS. 12A or 12B) displayed as a cursor CS and then returns to step SP101.

In addition, if the result is negative at step SP122, the CPU proceeds to step SP124 to substitute a left cast (FIGS. 12A or 12B) for the cast currently displayed and to set the animation mode memory 31 to left animation mode. The CPU then returns to step SP101.

If the result is negative at step SP110, the CPU proceeds to step SP126 to determine whether or not the timer indicates that a certain time has passed. If not, it proceeds to step SP127 to determine whether or not the current animation mode is right. If so, the CPU proceeds to step SP120 to substitute a right cast (FIGS. 12C or 12D) for the cast currently displayed and to set the animation mode memory 31 to right animation mode. The CPU then returns to step SP101.

In addition, if the result is negative at step SP127, the CPU proceeds to step SP128 to determine whether or not the current animation mode is left. If so, it proceeds to step SP124 to substitute a left cast (FIGS. 12A or 12B) for the cast currently displayed and to set the animation mode memory 31 to left animation mode. The CPU then returns to step SP101.

Further, if the result is negative at step SP128 and positive at step SP126, the CPU proceeds to step SP129 to determine whether or not the current animation mode is still. If not, it proceeds to step SP130 to substitute a still cast (FIGS. 12E or 12F) for the cast currently displayed and to set the animation mode memory 31 to still animation mode. It then returns to step SP101. In addition, if the result is positive at step SP129, it proceeds to step SP132 to switch the still cast (FIGS. 12E or 12F) displayed as a cursor CS and then returns to step SP101.

When the CPU returns to step SP101, it again determines whether or not the local button 6 has been pressed. If so, it proceeds to step SP102 to determine whether or not a search picture has been displayed. In a second search, the result is positive at this step and the CPU proceeds to step SP133 to cancel the mode being searched and at step SP134, erases the search picture to return to step SP101. Then, if the result is negative at step SP101, the CPU proceeds to step SP135 to determine whether or not a search picture has been displayed and if not, returns to step SP101.

When the above processing is performed, the local button 6 is used as a toggle switch. Pressing the local button 6 once displays the local search picture and actuates a mode which enables search. Pressing the button 6 again during this state erases the view search picture and pauses search. Pressing the local button 6 again displays the local search picture and actuates a mode which enables search.

In addition, if the result is positive at step SP135, the CPU again performs a processing loop of steps SP108 to SP132. If the result is positive at step SP109, the CPU proceeds to step SP136 to determine whether or not the target reproduction position is the same as the reproduction position. If so, it returns to step SP101. The said determination step is required to determine whether or not search must be performed by fast forwarding or rewinding the magnetic tape because the target reproduction position is different from the current reproduction position.

Therefore, if the result is negative at step SP136, the CPU proceeds to step SP137 and sends a search instruction to the VTR running control circuit 28 ordering that the magnetic tape be moved to a frame assigned by a time code added to a picture index IDX containing the target reproduction position. Then, at step SP138, the CPU executes operations required to indicate that search is being performed and at step SP139, ends the local search program SP100.

With the above constitution, if the user presses the local button 6 while the video tape recorder 1 is performing reproduction, a linear band LB superimposed on a reproduction picture VD and composed of picture indices IDX near the reproduction position is displayed on the display screen DSP of the color liquid crystal display 2. Thus, if the user moves the roller 7 around, the cursor CS indicating a target reproduction position on the display screen DSP moves in response to the rotation of the roller 7.

Therefore, if the user presses the "look" button 9 after a target reproduction position is determined, a new screen is displayed indicating that search is being performed. Once search is ended, reproduction is started from the target reproduction position and a corresponding screen is displayed. Thus, using this video tape recorder 1, if the reproduction position and the target reproduction position are relatively close, a linear band LB having video indices IDX on the display screen DSP can be referenced to visually and intuitively search the target reproduction position, resulting in substantially improved user-friendliness in search.

(1-5) Global Search Processing

Figure 16:
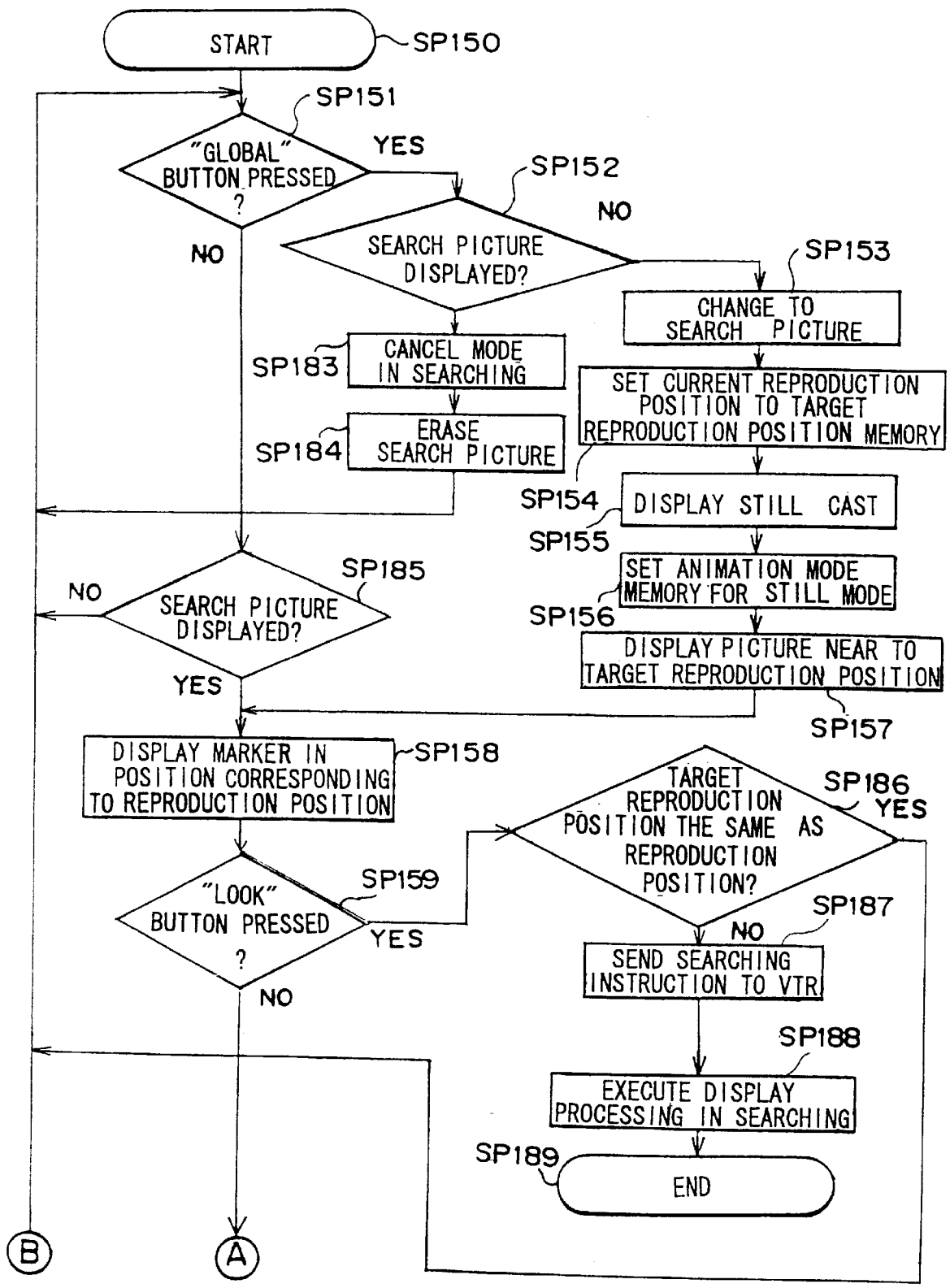
FIGS. 16 and 17 are flow charts describing a global search procedure.
Figure 17:
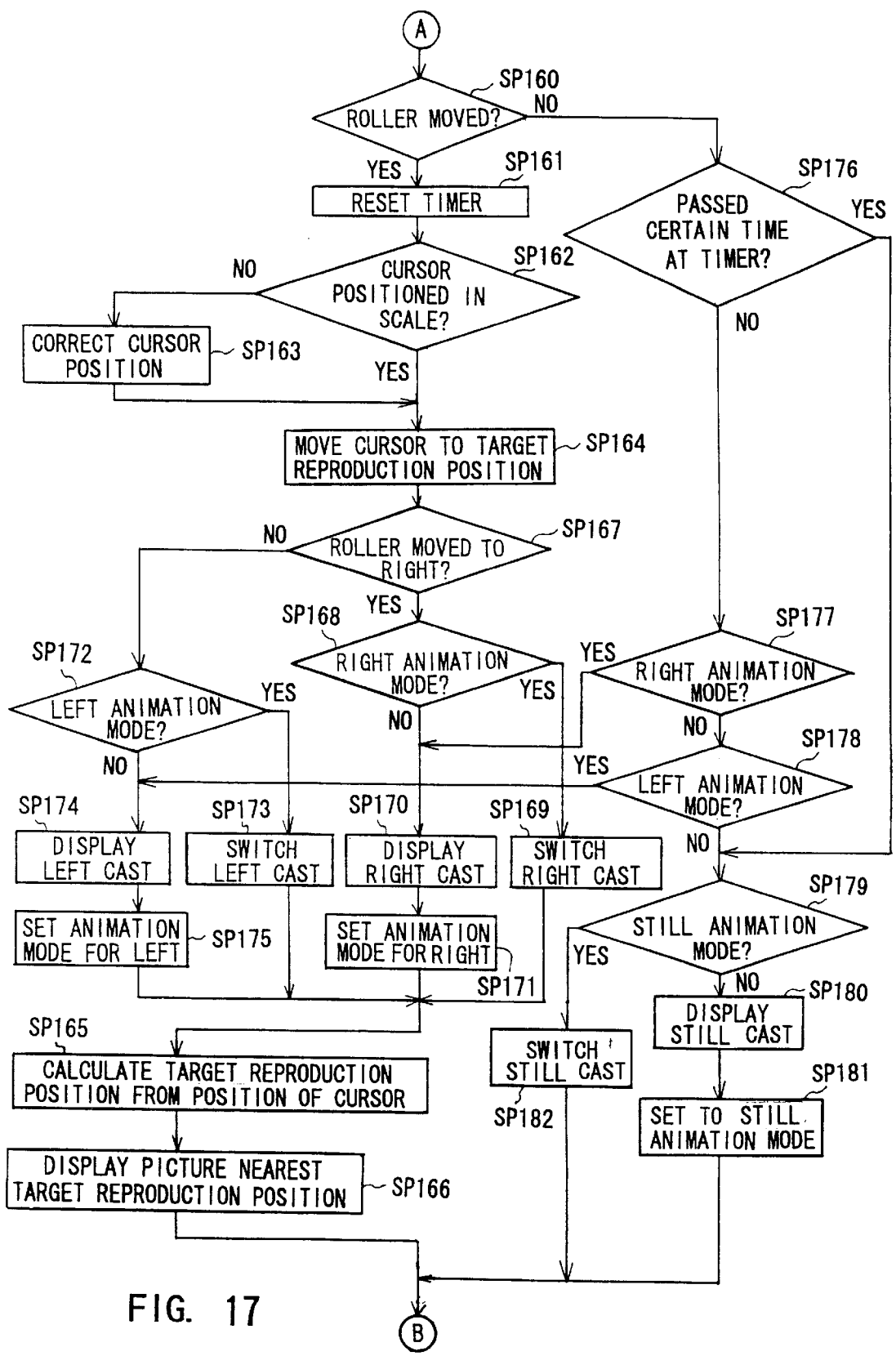

When the global button 4 is pressed, the CPU for the search control circuit 22 and the display picture generating circuit 25 in the video tape recorder 1 executes a global search program SP150 shown in FIGS. 16 and 17, using picture indices IDX, as a search operation for steps SP13 to SP15 within the main processing procedure SP0 (FIGS. 3 and 4).

Figure 18:
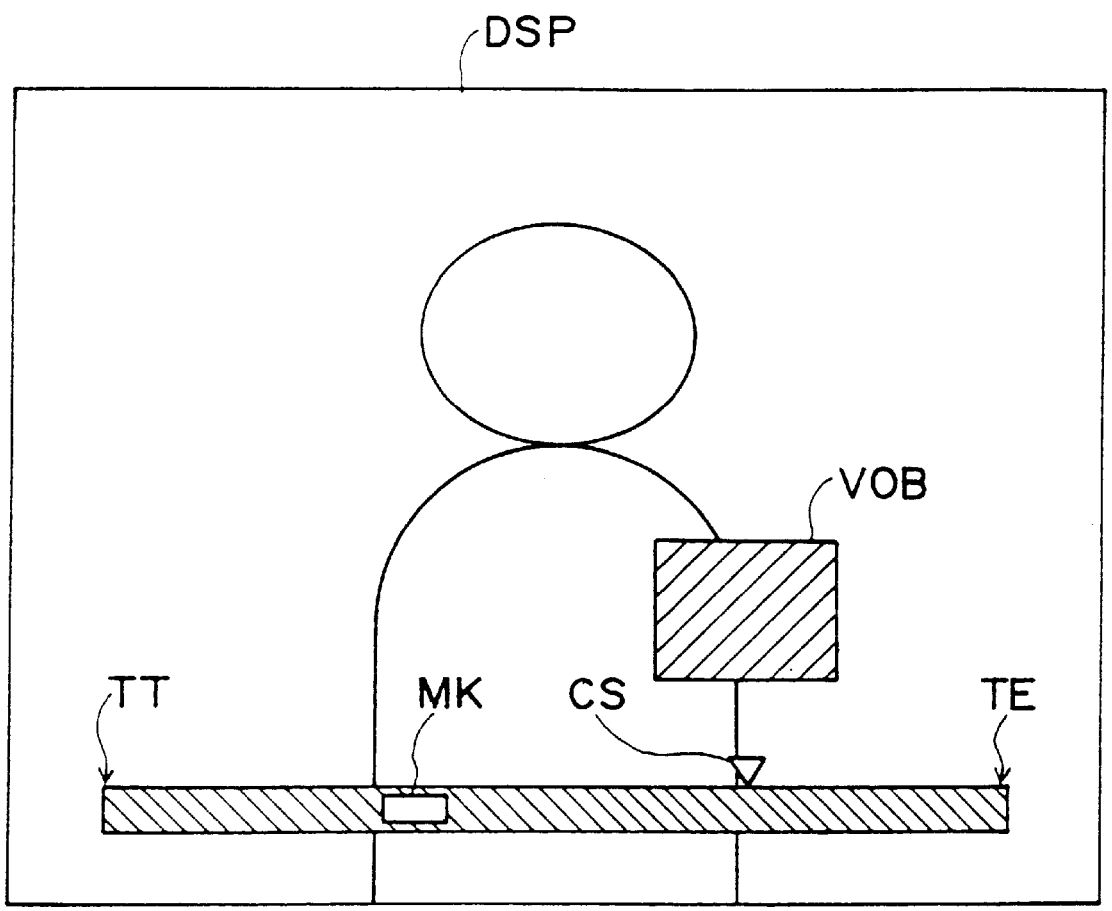
FIG. 18 is a schematic diagram describing a screen configuration during the global search procedure of FIGS. 16 and 17.

During global search, a scale SK which indicates reproducible regions on the magnetic tape is superimposed on a video image VD displayed on the display screen DSP, and the cursor CS points at a target reproduction position on the scale SK, as shown in FIG. 18.

In this case, the first reproducible position TT is located at the left end of the scale SK and the last reproducible position TE is located at the right end of the scale SK. In addition, the marker MK indicating a reproduction position and the cursor CS indicating a target reproduction position are displayed on the scale SK. Above the cursor CS, an image having a picture index in the target reproduction position is displayed as a sub-picture VOB.

In fact, the CPU for the search control circuit 22 and the display picture generating circuit 25 enters the global search program SP150 and determines at step SP151 whether or not the global button 4 has been pressed. If so, it proceeds to step SP152 and determines whether or not a picture to be searched has been displayed. In a first search, the result is negative at this point and the CPU proceeds to step SP153.

At step SP153, the CPU switches the reproducing picture displayed on the color liquid crystal display 2 to a search picture composed of the global search display picture DSP as described for FIG. 18 and at step SP154, sets the current reproduction position in the target reproduction position memory 27. The CPU then reads a still cast shown in FIGS. 12E or 12F from the animation icon memory 32 and displays it as a cursor CS. In addition, the CPU then performs step SP156 to set the animation mode memory 31 to still animation mode which enters still state.

Then, at step SP157, the CPU reads the picture index IDX which is the nearest to the target reproduction position from the target reproduction picture memory 33, according to the contents of the target image position memory 27, and displays it on the small picture VOB. At step SP158, the CPU displays the marker MK in a position corresponding to the reproduction position. It then proceeds to step SP159.

The CPU determines at step SP159 whether or not the "look" button 9 has been pressed. Ordinarily, pressing the global button 4 and subsequently pressing the "look" button 9 during global search causes search to be ended and the magnetic tape to be rewound to its beginning. In ordinary search, the result is negative at step SP159 and the CPU proceeds to step SP160.

The CPU determines at step SP160 whether or not the roller 7 has moved based on rotation information for the roller 7 input from the roller cursor position memory 24. If the result is negative at step S160, it proceeds to step SP161 to set the timer 29 for switching the display of the cast even if the roller 7 has not moved and then proceeds to step SP162.

The CPU determines at step SP162 whether or not the cursor CS is positioned within the scale SK. If not, it proceeds to step SP163 to make a correction so that the cursor CS is positioned on the scale SK and then proceeds to step SP164. If the result is positive at step SP162, the CPU proceeds to step SP164.

At step SP164, the CPU moves the cursor CS to the target reproduction position and determines at step SP167 whether or not the roller 7 has moved to the right. If so, the CPU proceeds to step SP168 to reference the animation mode memory 31 to determine whether or not the current animation mode is right. If so, it proceeds to step SP169 to switch the right cast (FIGS. 12C or 12D) displayed as a cursor CS and then ret urns to step SP165.

In addition, if the result is negative at step SP168, the CPU proceeds to step SP170 to display a right cast (FIGS. 12C or 12D) for the cast currently displayed and to set the animation mode memory 31 to right animation mode. The CPU then returns to step SP165.

Further, if the result is negative at step SP167, the CPU proceeds to step SP172 to reference the animation mode memory 31 to determine whether or not the current animation mode is left. If so, it proceeds to step SP173 to switch the left cast (FIGS. 12A or 12B) displayed as a cursor CS and then returns to step SP165.

In addition, if the result is negative at step SP172, the CPU proceeds to step SP174 to display a left cast (FIGS. 12A or 12B) for the cast currently displayed and to set the animation mode memory 31 to left animation mode. The CPU then returns to step SP165.

If the result is negative at step SP160, the CPU proceeds to step SP176 to determine whether or not the timer indicates that a certain time has passed. If not, it proceeds to step SP177 to determine whether or not the current animation mode is right. If so, the CPU proceeds to step SP170 to display a right cast (FIGS. 12C or 12D) for the cast currently displayed and to set the animation mode memory 31 to right animation mode (step SP171). The CPU then returns to step SP165.

In addition, if the result is negative at step SP177, the CPU proceeds to step SP178 to determine whether or not the current animation mode is left. If so, it proceeds to step SP174 to display a left cast (FIGS. 12A or 12B) for the cast currently displayed and to set the animation mode memory 31 to left animation mode (step SP175). The CPU then returns to step SP165.

In actuality, at steps SP165 and SP166, the CPU calculates the target reproduction position from the position of the cursor CS, reads from the target reproduction position screen memory 33 and display picture the nearest to the target reproduction position, displays the picture index IDX on the sub-picture VOB, and then returns to step SP151.

If the result is negative at step SP178 and positive at step SP176, the CPU proceeds to step SP179 to determine whether or not the current animation mode is still. If not, it proceeds to step SP180 to display a still cast (FIGS. 12E or 12F) for the cast currently displayed and to set the animation mode memory 31 to still animation mode. It then returns to step SP151. In addition, if the result is positive at step SP179, it proceeds to step SP182 to switch the still cast (FIGS. 12E or 12F) displayed as a cursor CS and then returns to step SP151.

When the CPU returns to step SP151, it again determines whether or not the global button 4 has been pressed and if so, proceeds to step SP152 to determine whether or not a search picture has been displayed. In a second search, the result is positive at this step and the CPU proceeds to step SP183 to cancel the mode being searched and at step SP184, erases the search picture to return to step SP151. Then, if the result is negative at step SP151, the CPU proceeds to step SP185 to determine whether or not a search picture has been displayed. If not, it returns to step SP151.

When the above processing is performed, the global button 4 is used as a toggle switch. Pressing the global button 4 once displays the global search picture and actuates a mode which enables search and pressing the button 4 again during this mode erases the view search picture and suspends search. Pressing the global button 4 again displays the global search picture and actuates a mode which enables search.

In addition, if the result is positive at step SP185, the CPU again performs a processing loop of steps SP158 to SP182. If the result is positive at step SP159, the CPU proceeds to step SP186 to determine whether or not the target reproduction position is the same as the reproduction position. If so, it returns to step SP151. The said determination step is required to determine whether or not search must be performed by fast forwarding or rewinding the magnetic tape because the target reproduction position is different from the current reproduction position.

Therefore, if the result is negative at step SP186, the CPU proceeds to step SP187 and sends a search instruction to the VTR running control circuit 28 ordering that the magnetic tape be moved to a frame assigned by a time code added to a picture index IDX containing the target reproduction position. At step SP188, the CPU executes operations required to indicate that search is being performed. At step SP189, it ends the global search processing SP150.

With the above constitution, if the user presses the global button 4 while the video tape recorder 1 is performing reproduction, a scale SK superimposed on the reproduction picture VD and comprising reproducible regions is displayed on the display screen DSP of the color liquid crystal display 2. Thus, if the user moves the roller 7 around, the cursor CS indicating a target reproduction position on the display screen DSP moves in response to the rotation of the roller 7. At this point, a reduced still image comprising video indices IDX near the target reproduction position is displayed in a sub-picture VOB above the cursor CS.

Therefore, if the user presses the "look" button 9 after a target reproduction position is determined, a new screen is displayed indicating that search is being performed. Once search is terminated, reproduction is started from the target reproduction position and a corresponding picture is displayed. Thus, with this video tape recorder 1, the scale SK and the sub-picture VOB on the display screen DSP can be referenced to visually and intuitively search for the target reproduction position on the magnetic tape as a whole, resulting in substantially improved user-friendliness in search.

(1-6) Index Picture Display Processing

Figure 19:
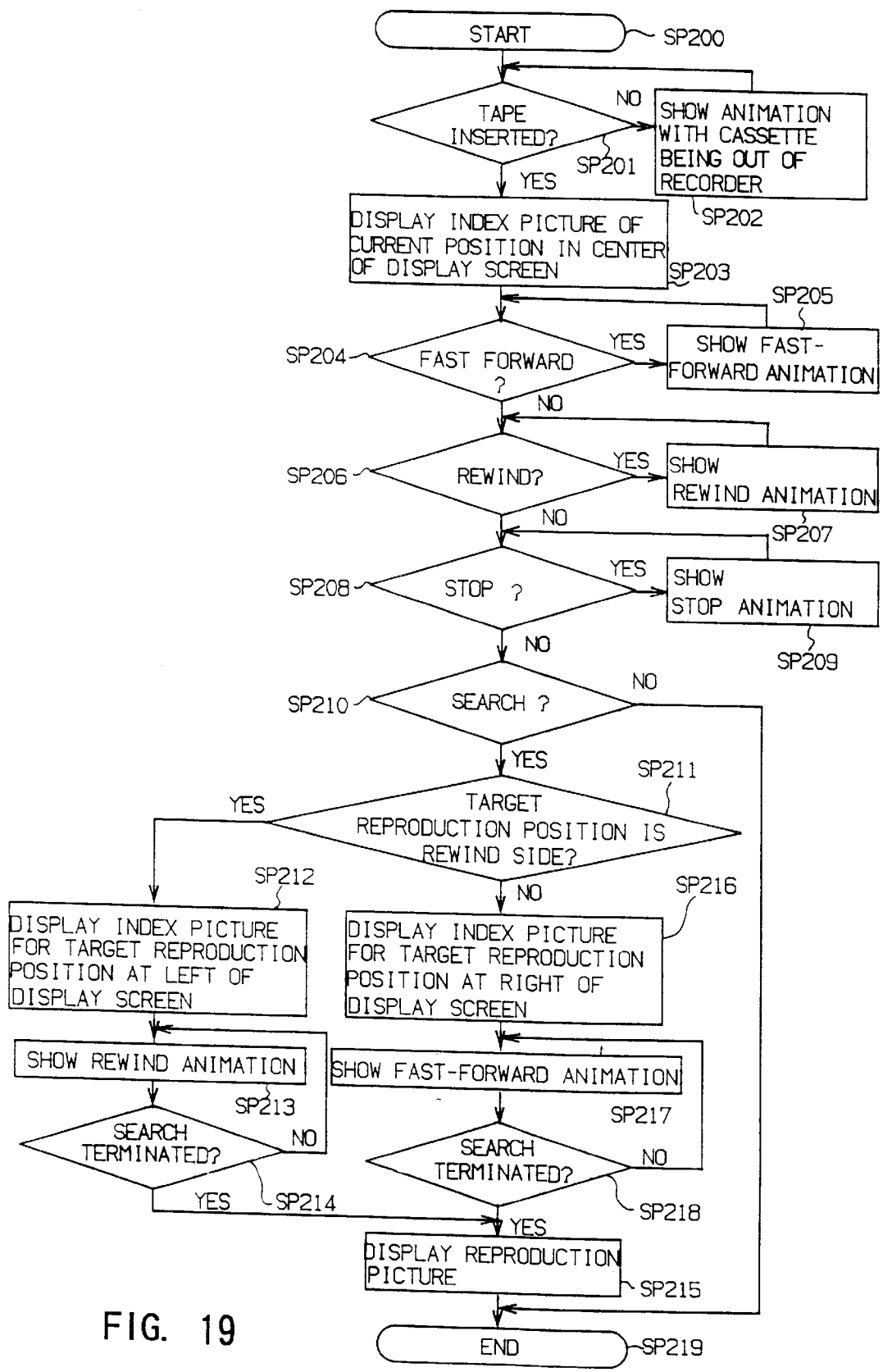
FIG. 19 is a flow chart describing an index picture display procedure.

The CPU for the search control circuit 22 and the display picture generating circuit 25 in the video tape recorder 1 executes an index picture display procedure SP200 shown in FIG. 19 as a search picture operation at step SP89 in the view search program SP50 (FIG. 9), step SP139 in the local search program SP100 (FIG. 13), and step SP189 in the global search program SP150 (FIG. 16).

During index picture display, the video tape recorder 1 can display index pictures near a transit position during a stop, search, fast-forward, or rewind operation. Also, during search, it can display index pictures near a target reproduction position.

Figure 20:
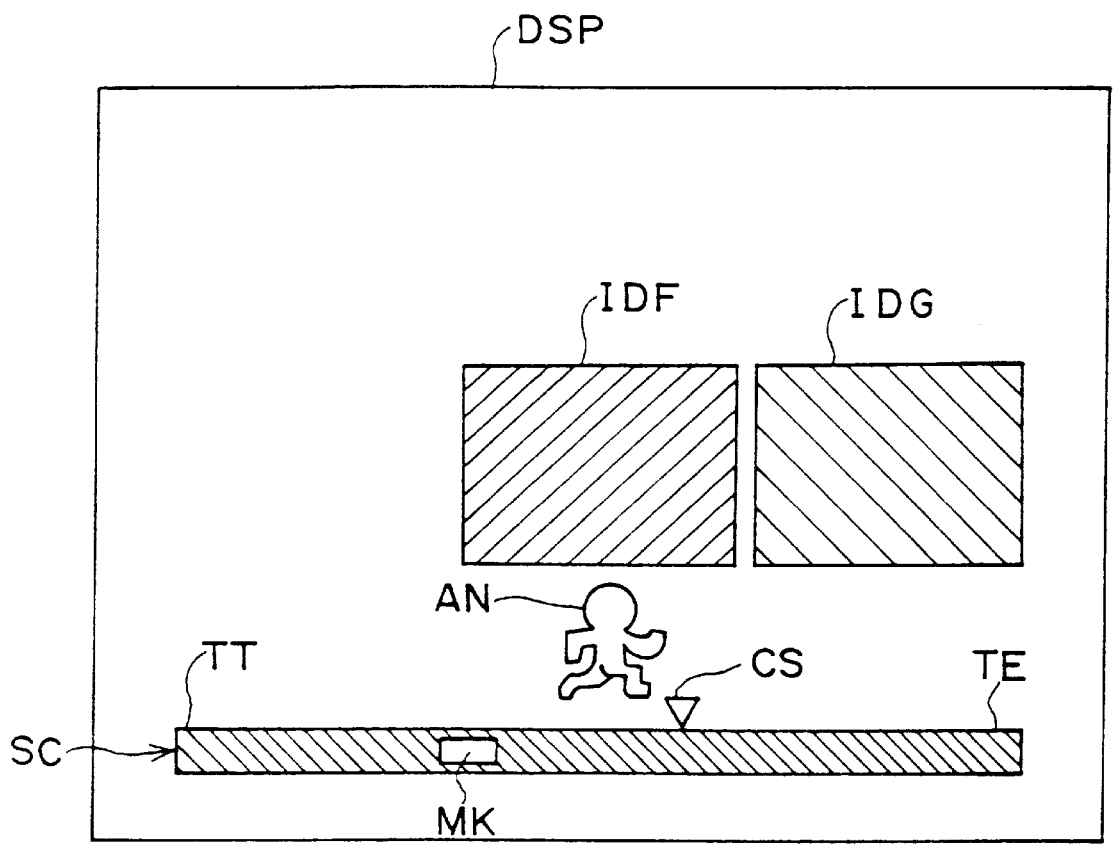
FIG. 20 is a schematic diagram describing a screen constitution during the index picture display procedure of FIG. 19.

In this case, for example, as shown in FIG. 20, a blue background and the scale SK which indicates reproducible regions on the magnetic tape are displayed on the display screen DSP. The first reproducible position TT is located at the left end of the scale SK, while the last reproducible position TE is located at the right end. In addition, a current position marker MK1 indicating the currently reproducible position and a marker MK2 indicating a target reproduction position during search are provided on the scale SK.

Index pictures near a currently reproducible position IDF are displayed in the center of the display screen DSP. During search, index pictures near the target reproduction position IDG are displayed to the left of the IDF if the target reproduction position is in the rewinding direction, and otherwise to the right.

In addition, an animated picture AN shows how the VTR mechanical deck 35 is currently operating. The animated image moves in the direction in which the VTR mechanical deck 35 is running during a search, fast forward, or rewind operation, and walks in place when the VTR is stopped.

In fact, the CPU for the search control circuit 22 and the display picture generating circuit 25 first enters the index picture display program SP200 and displays in an assigned position the blue background and the scale SK, which compose the index picture display screen DSP described for FIG. 20. Then, at step SP201, the CPU checks the operation of the VTR mechanical deck 35 to determine whether or not a cassette tape is inserted in the recorder 1.

If the result is negative at step SP201, the CPU proceeds to step SP202 to display on the display screen DSP an animated image showing a cassette tape which is out of the recorder 1 and then returns to step SP201 to wait for a cassette tape to be inserted. In addition, if the result is positive at step SP201, the CPU proceeds to step SP203 to display in the center of the display screen DSP an index picture which is in the current position IDF and then proceeds to step SP204.

At step SP204, the CPU checks the operation of the VTR mechanical deck 35 to determine whether or not the magnetic tape is being fast forwarded. If so, the CPU proceeds to step SP205 to display a fast-forward animated image and then returns to step SP204.

Figure 12C:
Figure 12D:
Figure 12E:
Figure 12F:

The fast-forward animated image suggests a character running to the right by switching back and forth between the two right casts described for FIG. 12 (FIGS. 12C and 12D). In addition, if the result is negative at step SP204, the CPU proceeds to step SP206.

At step SP206, the CPU checks the operation of the VTR mechanical deck 35 to determine whether or not the magnetic tape is being rewound. If so, the CPU proceeds to step SP207 to display a rewind animated image and then returns to step SP206.

The rewind animated image suggests a character running to the left by switching back and forth between the two left casts described for FIG. 12 (FIGS. 12A and 12B). In addition, if the result is negative at step SP206, the CPU proceeds to step SP208.

At step SP208, the CPU checks how the VTR mechanical deck 35 is operating to determine whether or not the magnetic tape is stopped. If so, the CPU proceeds to step SP209 to display a stop animated picture and then returns to step SP208.

The stop animated picture suggests a character stepping in place and facing forward by switching back and forth between the two still casts described for FIG. 12 (FIGS. 12E and 12F). In addition, if the result is negative at step SP208, the CPU proceeds to step SP210.

The CPU determines at step SP210 whether or not the current operation is search, that is, the index picture display program SP200 is being executed as a search picture operation at step SP89 in the view search program SP50, at step SP139 in the local search program SP100, or at step SP189 in the global search program SP150.

If the result is positive at step SP210, the CPU proceeds to step SP211 to determine whether or not the target reproduction position determined through search is in the rewinding direction. If so, the CPU proceeds to step SP212 to display an index picture in the target reproduction position IDG on the left of the display screen DSP. Then, at step SP213, it displays the rewind animated picture and determines at step SP214 whether or not search should be terminated. This determination is based on whether or not the current position matches the target reproduction position. If the result is negative at step SP214, the CPU returns to step SP213, but if the result is affirmative at step SP214, it proceeds to step SP215.

In addition, if the result is negative at step SP211, the CPU proceeds to step SP216 to display an index picture in the target reproduction position IDG on the right of the display screen DSP and at step SP217, displays the fast-forward animated picture. It then determines at step SP218 whether or not search should be terminated. This determination is based on whether or not the current position matches the target reproduction position. If the result is negative at step SP218, the CPU returns to step SP217, but if the result is positive at step SP218, it proceeds to step SP215.

At step SP215, the CPU displays a reproduction picture corresponding to the target reproduction position determined through search and at step SP219, terminates the index picture display program SP200. In addition, if the result is negative at step SP210, the CPU proceeds to step SP219 to terminate the index picture display program SP200.

According to the above constitution, if the user performs a stop, fast-forward, or rewind operation on the video tape recorder 1, index pictures near a transit position and an assigned animated picture are displayed and in particular, during search, index pictures near the current and target reproduction positions and an assigned animated picture showing the search direction are displayed. This allows the user to visually and intuitively determine the operation of the video tape recorder 1 by viewing the display screen.

(1-7) Advantages of the Embodiment

With the above constitution, a video tape recorder 1 can be provided which stores a plurality of index pictures compressed and reduced after being extracted from motion pictures recorded on the magnetic tape at an interval of 15 seconds in time sequence, with time codes in the memory provided in the cassette tape case for the magnetic tape, displays the index pictures read from the memory on the display screen of the color liquid crystal display 2, uses the roller 7 to search a target reproduction picture to be reproduced, and rewinds or fast forwards the magnetic tape to the searched target reproduction position to initiate a reproduction operation, thus allowing search conditions to be visually and intuitively determined while searching stored data on the magnetic tape and providing substantially improved user-friendliness.

Furthermore, with the above constitution, if the user presses the view button 5 during reproduction, picture indices IDX near the current reproduction position are arranged and displayed on the display screen DSP of the color liquid crystal display 2 as matrices, and the cursor CS indicating a target reproduction position on the display screen DSP moves in response to the rotation of the roller 7 operated by the user, so that search can be executed while viewing picture indices IDX near the target reproduction position as search conditions. As a result, the video tape recorder 1 which provides very user-friendly search operations can be provided.

Furthermore, with the above constitution, if the user presses the local button 6 during reproducing, a linear band LB superimposed on a reproduced picture VD and comprising a plurality of picture indices IDX near the current reproduction position IDX is displayed on the display screen DSP of the color liquid crystal display 2 and the cursor CS indicating a target reproduction position on the display screen DSP moves in response to the rotation of the roller 7 operated by the user, so that a search can be executed while viewing picture indices near the target reproduction position on the reproduction screen VD as search conditions. As a result, a video tape recorder 1 which provides very user-friendly search operations can be provided.

Furthermore, with the above constitution, if the user presses the global button 4 during reproducing, a scale SK superimposed on a reproduced picture VD and comprising reproducible regions is displayed on the display screen DSP of the color liquid crystal display 2, the cursor CS indicating a target reproduction position on the display screen DSP moves in response to the rotation of the roller 7 operated by the user, and a reduced still picture having picture indices near the target reproduction position IDX is displayed in a sub-picture VOB above the cursor CS, so that search can be executed while viewing on the reproduced picture VD as search conditions the target reproduction position on the magnetic tape and video indices IDX near it. As a result, a video tape recorder 1 which provides very user-friendly search operations can be provided.

Furthermore, with the above constitution, if the user issues a stop, fast-forward, or rewind instruction for the magnetic tape, a scale indicating recordable regions on the magnetic tape, index pictures near a transit position, and assigned animated figures indicating a stop, fast-forward, or rewind operation are displayed and in particular, during reproducing, the scale, the current position, index pictures near the target reproduction position, and a specified animated picture showing the search direction are displayed, so that the user can visually and intuitively determine the movement state at the magnetic tape and how search is being performed while viewing the display screen DSP. As a result, a video tape recorder 1 which provides very user-friendly search operations can be provided.

(1-8) Other Embodiments

A number of specific embodiments of the present invention have been described wherein motion pictures are recorded on the magnetic tape. However, the invention is also applicable to other recording media such as optical, magneto-optical, or magnetic disks and similar effects can be achieved if any such recording media are used.

The above embodiments have been described in conjunction with picture indices which are generated by sampling motion pictures at an intervals of 15 seconds. However, this invention is also applicable to 30 second, 1 minute, or other desired sampling intervals as well as the 15 second interval. The invention is also applicable not only to sampling at regular intervals but also to sampling in response to motion picture scene changes, recording start timing, or index mark timing.

The above embodiments have been described in conjunction with video indices which are generated by reducing and compressing sampled pictures. However, whether sampled pictures are reduced or compressed depends upon memory capacity. Similar effects can be achieved even if only reduction or compression is executed or if pictures themselves are used as video indices.

The above embodiments use an EEPROM located in the cassette tape case to store video images. However, given regions such as the recording start or end positions of the recording medium can also be used to store them and they can even be stored in the main body of the video tape recorder if the recording medium can be identified. Therefore, a RAM or an EEPROM whose data is retained by the power supply or even a magnetic disk device can also be used as a storage medium.

The above embodiments have been described in conjunction with a roller built into the main body of the video tape recorder as a position assigning means for moving the cursor displayed on the screen. However, similar effects could be achieved if the cursor were moved by combining a pointing device such as a mouse or a track ball with switches.

The above embodiments use as a cursor an animated character which runs in the direction in which the cursor moves and walks in place when the cursor is at rest. However, this invention is also applicable to animated pictures which are motionless in the position where the cursor is at rest, and the cursor could as well be something that suggests a living body such as a fish, an insect, an animal, or a bird. Similar effects could also be achieved with a characterized object.

The above embodiments have been described in conjunction with a linear band displayed on the display screen as a scale. However, this invention is also applicable to scales of other shapes, and similar effects could be achieved by displaying a circular or semicircular band or any curved band.

The above embodiments have been described with the present invention applied to a video tape recorder mounted with a display screen and a control part. However, the invention is also applicable to video tape recorders with a separate control part and a separate display screen and, if only search is required, to those dedicated to reproducing operations. Furthermore, the-invention is widely and preferably applicable to motion picture reproducing apparatus and motion picture recording and reproducing apparatus such as optical or magneto-optical disk devices, or even magnetic disk devices.

(1-9) As described above, according to this invention, a motion picture reproducing apparatus and a motion picture recording and reproducing apparatus can be provided which store a plurality of index pictures extracted from motion pictures recorded on motion picture magnetic tape in time sequence in a specified index picture storage means, display the index pictures read from the index picture storage means on the display screen in a specified format based on a specific search operation, use the position assigning means to search a target reproduction picture to be reproduced, and move the motion picture recording medium to the searched target reproduction position to initiate a reproduction operation, thus allowing reproduction conditions to be visually and intuitively determined when searching stored data on the motion picture recording medium, and providing substantially improved user-friendliness.

(2) Second Embodiment

A second embodiment of this invention will be described with reference to drawings:

(2-1) Embodiment of a Controller

Figure 21:
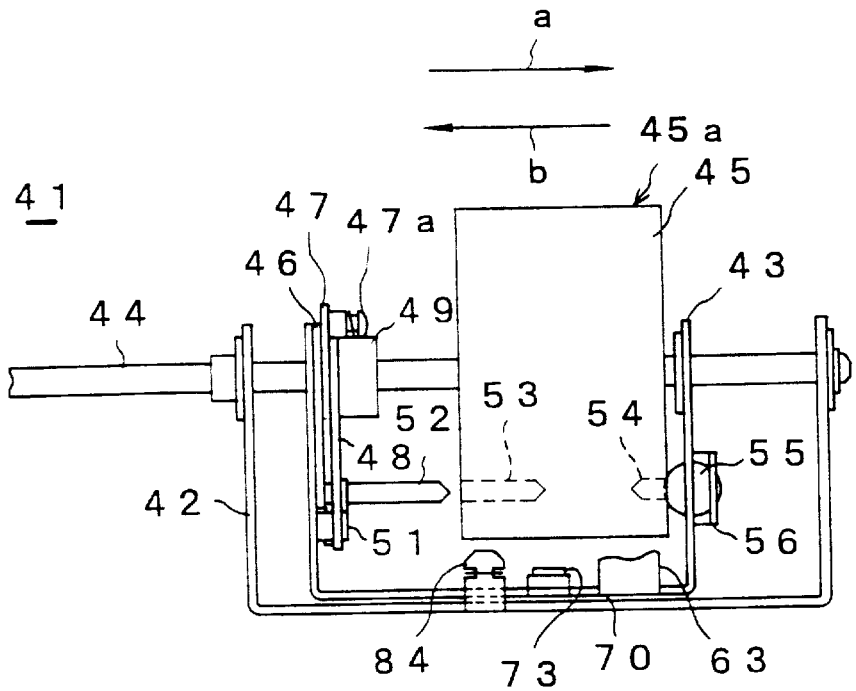
FIG. 21 is a side view showing an embodiment of a roller device according to this invention.

In FIGS. 21, a roller device 41 has a U-shaped fixed frame 42 and a U-shaped sliding frame 43 provided in the fixed frame 42 and slidable in the a and b directions.

The fixed frame 42 and the sliding frame 43 are provided with a shaft 44 which passes through the top portions of the sides of each frame. The shaft 44 is received by both sides of the fixed frame 42, and its movement in the "a" and "b" directions is restricted, but the shaft 44 is rotatable relative to the fixed frame 42. The sliding frame 43 is slidably installed on the shaft 44, whereby the sliding frame 43 is supported by the shaft 44 and is movable in the fixed frame in the a and b directions.

In the sliding frame 43 is installed a columnar roller 45 supported by the shaft 44. The roller 45 can rotate together with the shaft 44 in the sliding frame 43, but its movement in the a and b directions is restricted.

Thus, the relative position of the sliding frame 43 and the roller 45 can be changed corresponding to the movement of the sliding frame 43 in the a and b directions.

To the shaft 44 are installed a connecting arm 46, first resetting arm 47, second resetting arm 48, and a fixed ring 49 in that order from the side of the sliding frame 43 toward the roller 45. The fixed ring 49 is fitted integrally with the shaft 44, and movement of the connecting arm 46, first resetting arm 47 and second resetting arm 48 in the "a" and "b" directions is restricted by the side of the sliding frame 43 and the fixed ring 49. However, the connecting arm 46, first resetting arm 47, and second resetting arm 48 are rotatable on the shaft 44.

Figure 22:
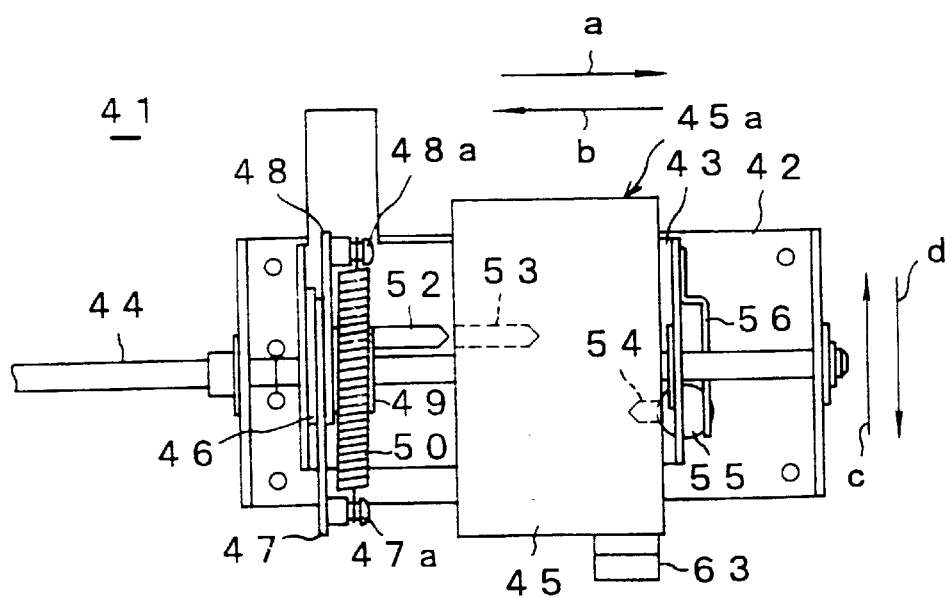
FIG. 22 is a top view of the roller device of FIG. 21.

On the end of the upper portions (the top and bottom directions of the fixed frame 42 are referred to as upper and lower, respectively) of the first and second resetting arms 47 and 48, spring pawls 47a and 48a are provided, respectively as FIG. 22 shows. A coil spring 50 is installed on spring pawls 47a and 48a. That is, the coil spring 50 is received by the pawl 47a of the first resetting arm 47 at one end and the pawl 48a of the second resetting arm 48 at the other end.

Thus a rotational force based on the resilience of the coil spring 50 is applied to the first and second resetting arms 47 and 48. That is, the first resetting arm 47 is given a rotational force counterclockwise when seen from the a direction, while the second resetting arm 48 is given a clockwise rotational force.

As FIG. 21 shows, the lower portion of one side of the fixed frame 42 has a lock pin 51, and the bottom end of the connecting arm 46 has a connecting pin 52 projecting toward the roller 45.

Figure 23:
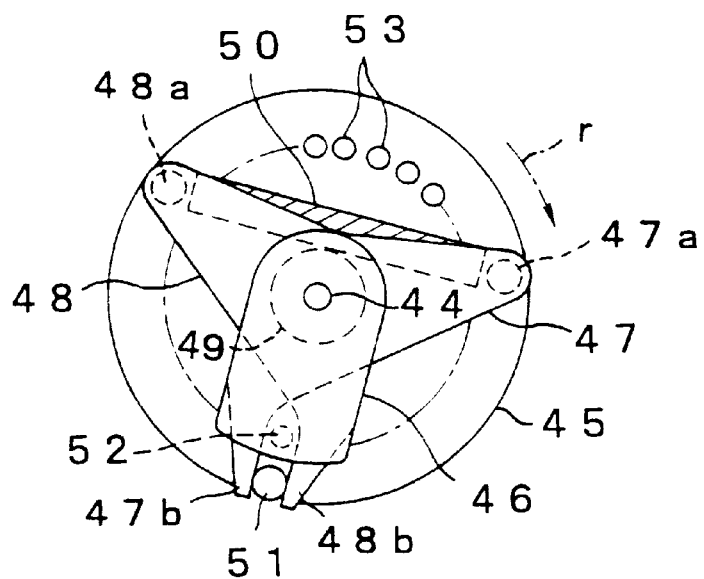
FIG. 23 is a front view showing the center resetting mechanism of the roller device.

As FIG. 23 shows, the first and second resetting arms 47 and 48 are of inverted V-shape, and the lock pin 51 and the connecting pin 52 are provided between lock pawls 47b and 48b formed on the lower ends of the first and second resetting arms 47 and 48, respectively.

Thus, the counterclockwise rotational force of the first resetting arm 47 and the clockwise rotational force of the second resetting arm 48, both given by the coil spring 50, are stopped by the lock pin 51, and the first and second resetting arms 47 and 48 are held in these states.

On the side of the roller 45 facing the connecting pin 52, a plurality of connecting holes 53 are formed on the circumference toward the inside of the roller 45. In this embodiment, 30 connecting holes 53 are formed on the circumference at equal intervals. Thus the connecting pin 52 is detachably fitted into any of the connecting holes 53 by the sliding action (in the "a" and "b" directions) of the sliding frame 43 and the rotational action of the roller 45.

On the other side of the roller 45 facing these connecting holes 53, click holes 54 (FIG. 29) in the same number as the connecting holes 53 are formed on the same circumference as connecting holes 53 at the same intervals as connecting holes 53.

As FIG. 22 shows, on the side of the sliding frame 43 facing the click holes 54, a hard ball 55 is held on the end of a holding leaf spring 56. The holding spring 56 is fixed on the sliding frame 43 at one end, and the hard ball 55 is mounted on the other end, whereby the holding spring 56 always urges the hard ball 55 in the direction of the roller 45. On the area on the sliding frame 43 which faces the hard ball 55, a hole is formed through which part of the hard ball 55 projects in the direction of the roller 45.

Thus the hard ball 55 is moved into contact with or separated from the side of the roller 45 by the sliding action of the sliding frame 43, and when the hard ball 55 comes into contact with the side of the roller 45, the hard ball 55 fits into the click holes 55 sequentially to perform click action.

Figure 24:
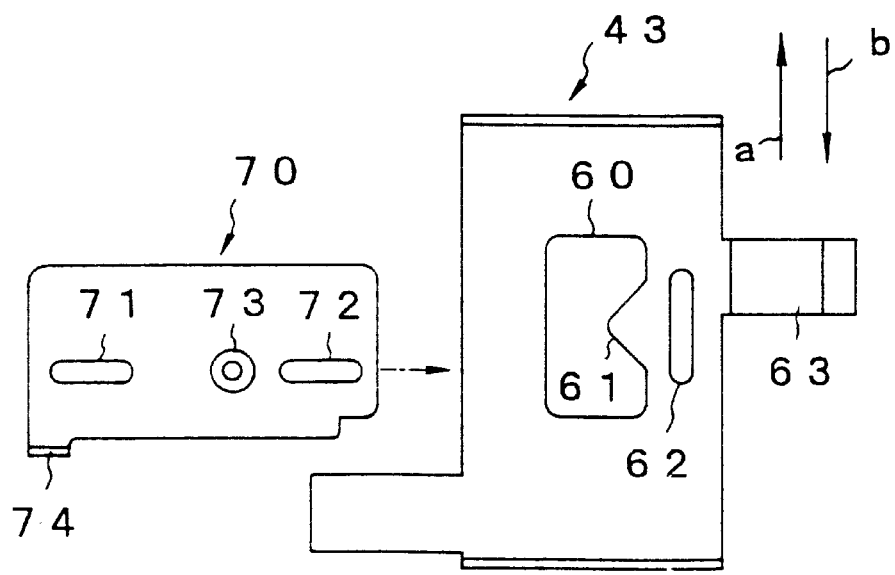
FIG. 24 is a top view showing the sliding frame and the locking member.

On the sliding frame 43, as FIG. 24 shows, an opening 60 is formed near the center of the bottom, and a projection 61 is formed near the center of the opening 60. Beside the projection 61 is formed a slot 62 extending in the sliding direction.

Here, the sliding frame 43 is placed on the fixed frame 42 through a rectangular lock member 70.

On both ends of the lock member 70, slots 71 and 72 are formed with their lengthwise direction perpendicular to the sliding direction. A roller 73 is provided between the slots 71 and 72.

Figure 25:
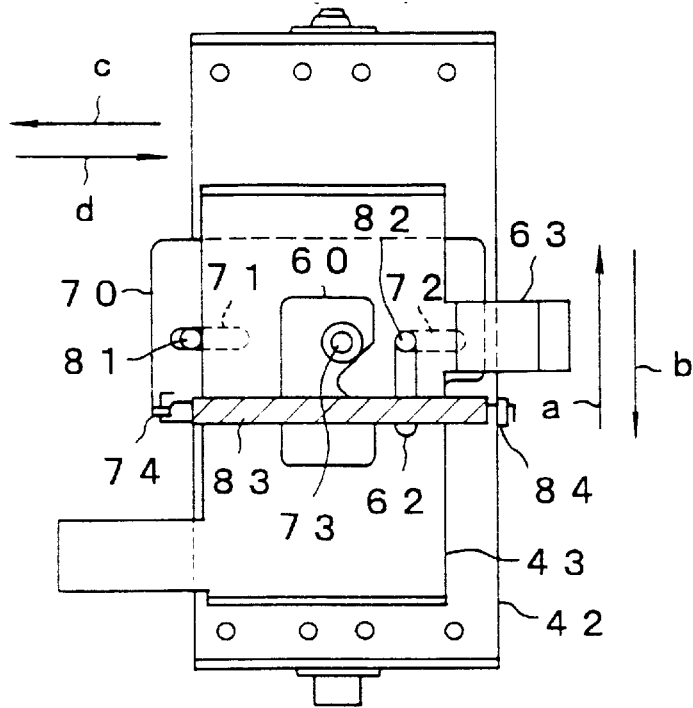
FIG. 25 is a top view showing the sliding mechanism in the clicked state.

FIG. 25 shows the state in which the sliding frame 43 and the lock member 70 are installed on the fixed frame 42. On the fixed frame 42, the lock member 70 and the sliding frame 43 are placed sequentially.

Here, through the slots 71 and 72, guide pins 81 and 82 provided on the fixed frame 42 are inserted. The fixed frame 42 and the lock member 70 are connected with the coil spring 83. That is, the coil spring 83 is received at one end by the spring pawl 84 formed on the right end of the fixed frame 42, and at the other end by the spring pawl 74 formed on the left end of the lock member 70. Thus the lock member 70 can be moved in the "c" and "d" directions in the range where slots 71 and 72 are formed, and is always urged in the "d" direction by the coil spring 83.

On the top of the lock member 70, the sliding frame 43 is placed with the guide pin 82 of the fixed frame 42 inserted in the slot 62, and the roller 73 of the lock member 70 in contact with the projection 61 of the opening 60. As described above, the sliding frame 43 is supported by the shaft 44 and can move only in the a and b directions.

A sliding arm 63 on the right-hand side of the sliding frame 43 moves the sliding frame 43 in the "a" and "b" directions.

Figure 26:
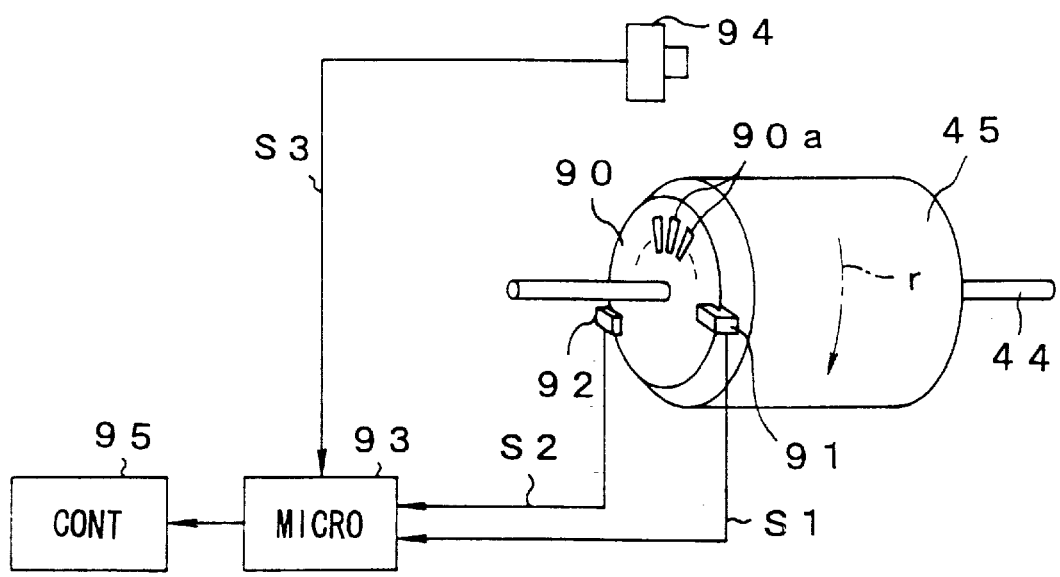
FIG. 26 is a schematic perspective view showing the rotation detecting device.

In addition to the above-described structure, as FIG. 26 shows, a disk 90 and photocouplers 91 and 92 are installed on the roller device 41.

The disk 90 is installed on the shaft 44 integrally with the shaft 44, whereby the disk 90 rotates the same amount as the roller 45.

The disk 90 is provided with a plurality of slits 90a, and with photocouplers 91 and 92 which sandwich slits 90a.

Photocouplers 91 and 92 are installed, for example, on the fixed frame 42, whereby detection signals S1 and S2, which arise each time the slits 90a pass the photocouplers 91 and 92 as the disk 90 is rotated, are transmitted to the microcomputer 93.

When the roller 45 is rotated in the "r" direction, detection signals S1 and S2 as shown in FIG. 27 are transmitted from the photocouplers 91 and 92. Here, the phase of detection signal S1 is delayed 90° from that of the detection signal S2.

When the roller 45 is rotated in the opposite direction of the "r" direction, detection signals S1 and S2 as shown in FIG. 28 are transmitted from the photocouplers 91 and 92. Here, the detection signal S1 is in a state with 90° faster phase than the detection signal S2.

Therefore, the microcomputer 93 judges that the roller 45 is rotated in the r direction when the phase of the detection signal S1 is delayed from the phase of the detection signal S2, but judges that the roller 45 is rotated in the opposite direction of the "r" direction when the phase of the detection signal S1 is faster than the detection signal S2.

Thus, the microcomputer 93 detects the rotational direction and amount of the roller 45 based on the phase difference of the detection signals S1 and S2 and the number of pulses respectively, and transmits the results of this detection to the control circuit 95 of the VCR.

In the above structure, when the sliding frame 43 is moved by the sliding arm 63 in the "b" direction, as FIG. 25 shows, the roller 73 moves to the slope of the projection 61 of the sliding frame in the "a" direction, and the guide pin 82 of the fixed frame 42 comes into contact with the end of the slot 62 of the sliding frame 43 in the a direction to stop the movement of the sliding frame 43 in the a direction. At this time, since the sliding frame 43 is given a displacement force in the "b" direction by the roller 73, and its movement in the "b" direction is stopped by the guide pin 82, the sliding frame 43 is maintained securely in the first state.

The roller device 41 is then in the click state as FIGS. 21 and 22 show. The hard ball 55 comes into contact with the click holes 54 formed on the side of the roller 45.

When the roller 45 is rotated by a finger on the circumference 45a of the roller 45, as FIG. 29 shows, the hard ball 55 fits the click holes 54 sequentially, and the roller 45 performs the click action at every predetermined angle with restricted rotation.

Figure 30:
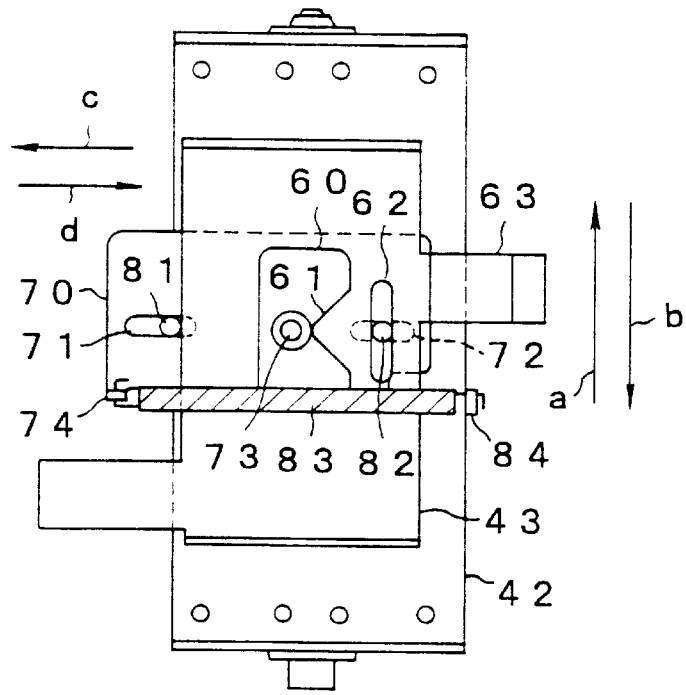
FIG. 30 is a top view showing the sliding mechanism in a transferring state.

Next, when the sliding frame 43 is moved in the "a" direction by applying a force greater than a predetermined value to the sliding arm 63, as FIG. 30 shows, the roller 73 climbs up the slope of the projection 61 in the a direction. Then the lock member 70 is moved in the "c" direction, and the coil spring 83 is stretched. Since this state is unstable for the sliding frame 43 and the lock member 70, the sliding frame 43 is easily moved in the "a" direction by returning the lock member 70 in the "d" direction.

Figure 31:
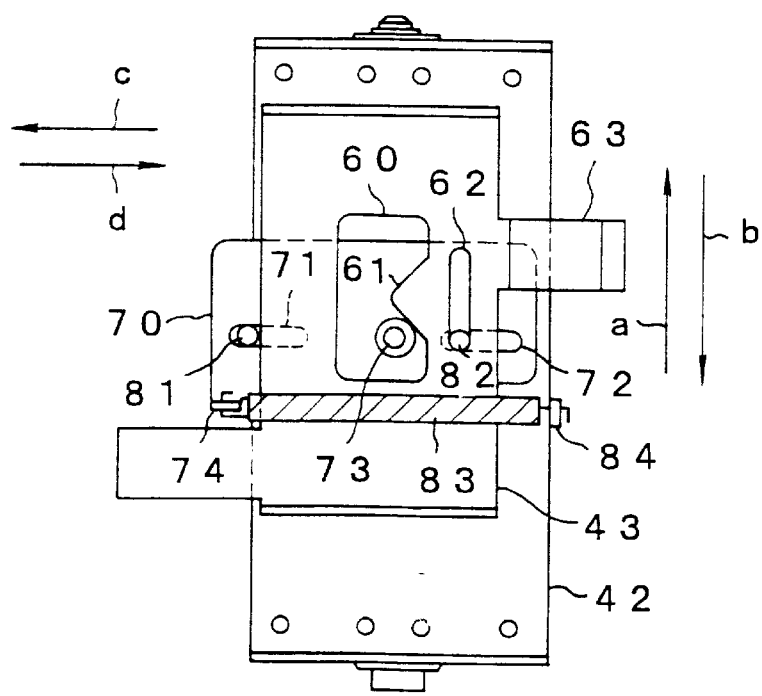
FIG. 31 is a top view showing the sliding mechanism in the center reset state.

As FIG. 31 shows, the roller 73 is moved to the slope of the projection 61 of the sliding frame 43 in the "b" direction, and the guide pin 82 of the fixed frame 42 comes into contact with the end of the slot 62 of the sliding frame 43 in the "b" direction, stopping the movement of the sliding frame 43 in the "b" direction. At this time, since the sliding frame 43 is given a displacement force in the a direction by the roller 73, and its movement in the "a" direction is stopped by the guide pin 82, the sliding frame 43 is maintained securely in the second state.

Thus, the sliding frame 43 is stopped securely in the first and second states.

Figure 32:
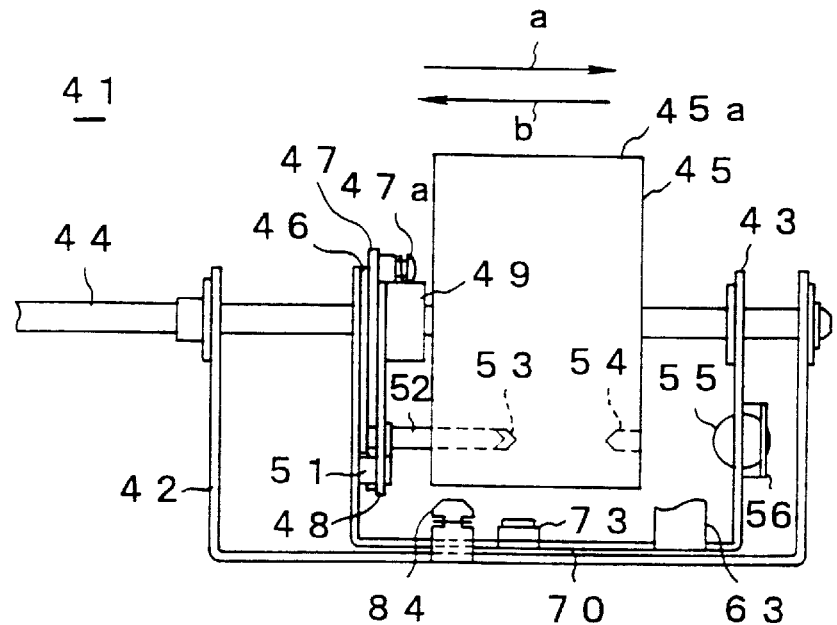
FIG. 32 is a side view showing the roller device of this invention reset to the center.
Figure 33:
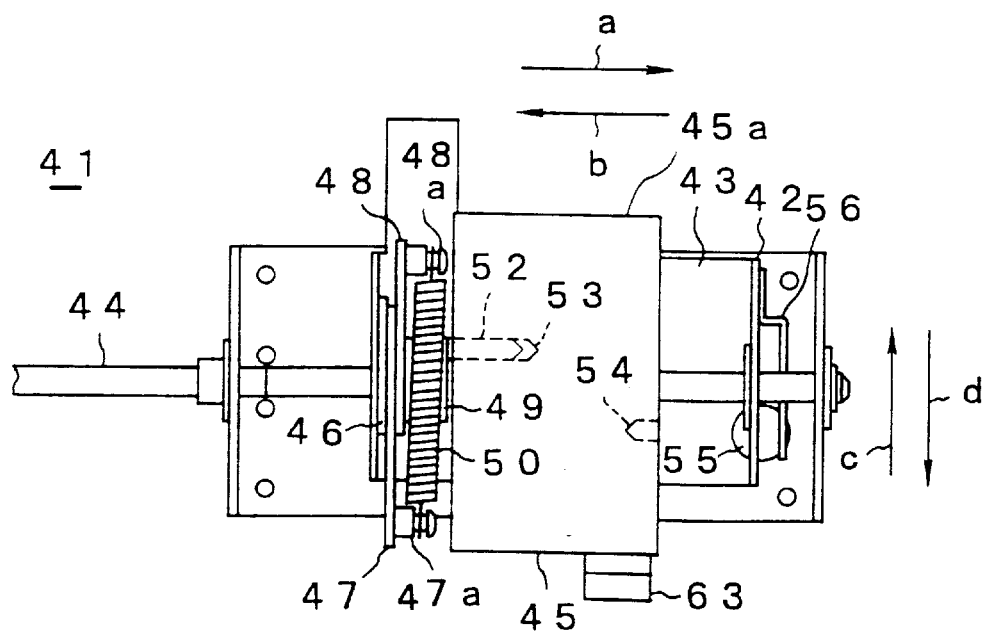
FIG. 33 is a top view of FIG. 32.

When the sliding frame 43 is in the second state, the roller device 41 is in the center reset state with the connecting pin 52 fitted in one of the connecting holes 53, as FIGS. 32 and 33 show.

Figure 34:
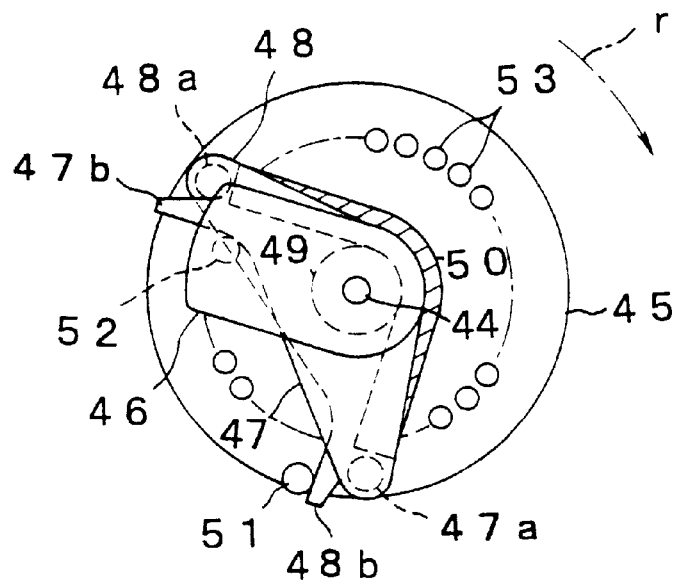
FIG. 34 is a front view of the center resetting mechanism illustrating the center resetting operation.

When the roller 45 is rotated in the "r" direction by a finger on the circumference 45a of the roller 45, as FIG. 34 shows, the connecting pin 32 rotates in the "r" direction together with the roller 45. At this time, the connecting pin 52 comes into contact with the lock pawl 47b of the resetting arm 47 and rotates the first resetting arm 47 in the "r" direction. The rotation of the second resetting arm 48 is restricted by the lock pin 51.

Therefore, when the roller 45 is rotated in the "r" direction, the coil spring 50 is wound on the fixed ring 49 and stretched, and the first resetting arm 47 is given a rotational force in the opposite direction of the "r" direction, whereby the roller 45 is always given a rotational force in the opposite direction of the "r" direction through the connecting pin 52.

Figure 35:
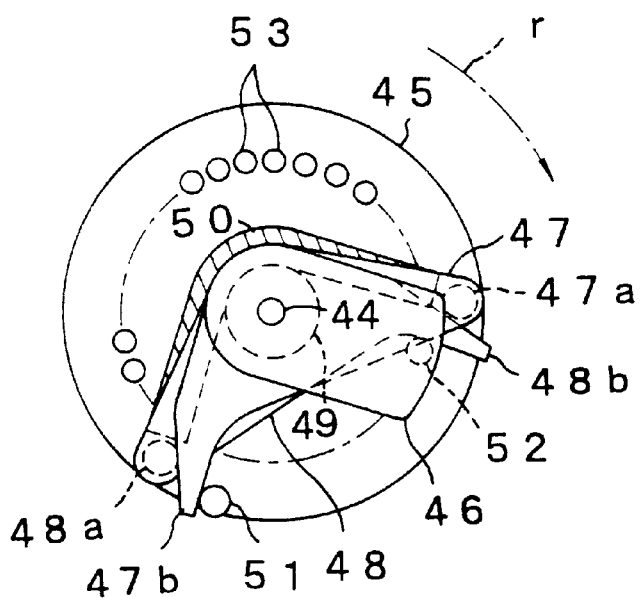
FIG. 35 is a front view of the center resetting mechanism illustrating the center resetting operation.

When the roller 45 is rotated in the opposite direction of the "r" direction, as FIG. 35 shows, the connecting pin 52 rotates together with the roller 45 in the opposite direction of the "r" direction. The connecting pin 52 then comes into contact with the lock pawl 48b of the second resetting arm 48, and rotates the second resetting arm 48 in the opposite direction of the "r" direction. At this time, the rotation of the first resetting arm 47 is restricted by the lock pin 51.

Therefore, when the roller 45 is rotated in the direction opposite to the "r" direction, the coil spring 50 is wound on the fixed ring 49 and stretched, and the first resetting arm 47 is given a rotational force in the "r" direction, whereby the roller 45 is always given a rotational force in the "r" direction through the connecting pin 52.

Thus, when the roller device 41 is in the center reset state, the rotation of the roller 45 gives the roller 45 a rotational force to be always reset to the center (FIG. 23) by the first and second resetting arms 47 and 48.

When the roller device 41 is in the center reset state and the roller 45 is rotated in the "r" direction, as FIG. 34 shows, the range of rotation of the roller 45 is to the extent that the lock pawl 47b of the first resetting arm 47 comes into contact with the spring hook pin 48a of the second resetting arm 48, while when the roller 45 is rotated in the direction opposite to the "r" direction, as FIG. 35 shows, the range of rotation is to the extent that the lock pawl 48b of the second resetting arm 48 comes into contact with the spring pawl 47a of the first resetting arm 47.

Through the above structure, the click action and the center resetting action are selectively switched so that these two actions can be operated using a single roller 45, and a roller device 41 with improved maneuverability and smaller size than conventional roller devices is realized.

(2-2) Embodiment of a VCR Controller

Figure 36:
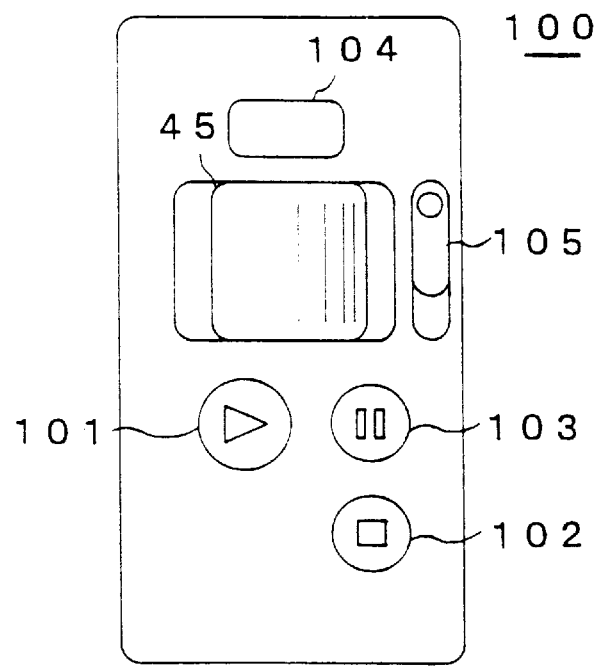
FIG. 36 is a top view showing an embodiment of a remote control according to this invention.

In FIG. 36, a VCR remote control 100 in which the roller device of FIG. 21 is incorporated is shown. On the control panel of the remote control 100, in addition to a play button 101, a stop button 102, and a pause button 103, there are a search button 104, a roller 45, and a switching lever 105.

Here, the switching lever 105 corresponds to the sliding arm 63 (FIG. 21). By moving the switching lever 105, the roller 45 can be switched to the click mode or the center resetting mode.

Figure 37:
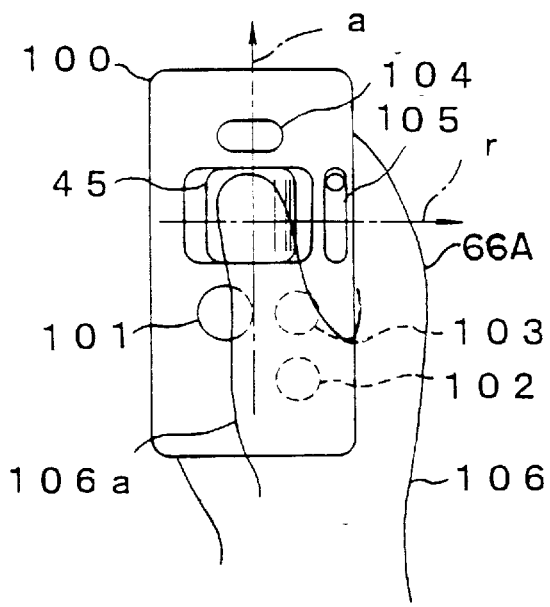
FIG. 37 is a schematic diagram illustrating the operation of the remote control of FIG. 36.

This remote control 100 is, as FIG. 37 shows, shaped and sized to fit into the palm of the operator 106. The shaft 44 of the roller 45 (FIG. 21) is roughly parallel to the lengthwise direction of the operator's thumb 106a.

Therefore, the operator can rotate the roller 45 easily by moving the thumb 106a in the "r" direction or in the direction opposite to the "r" direction.

Figure 38:
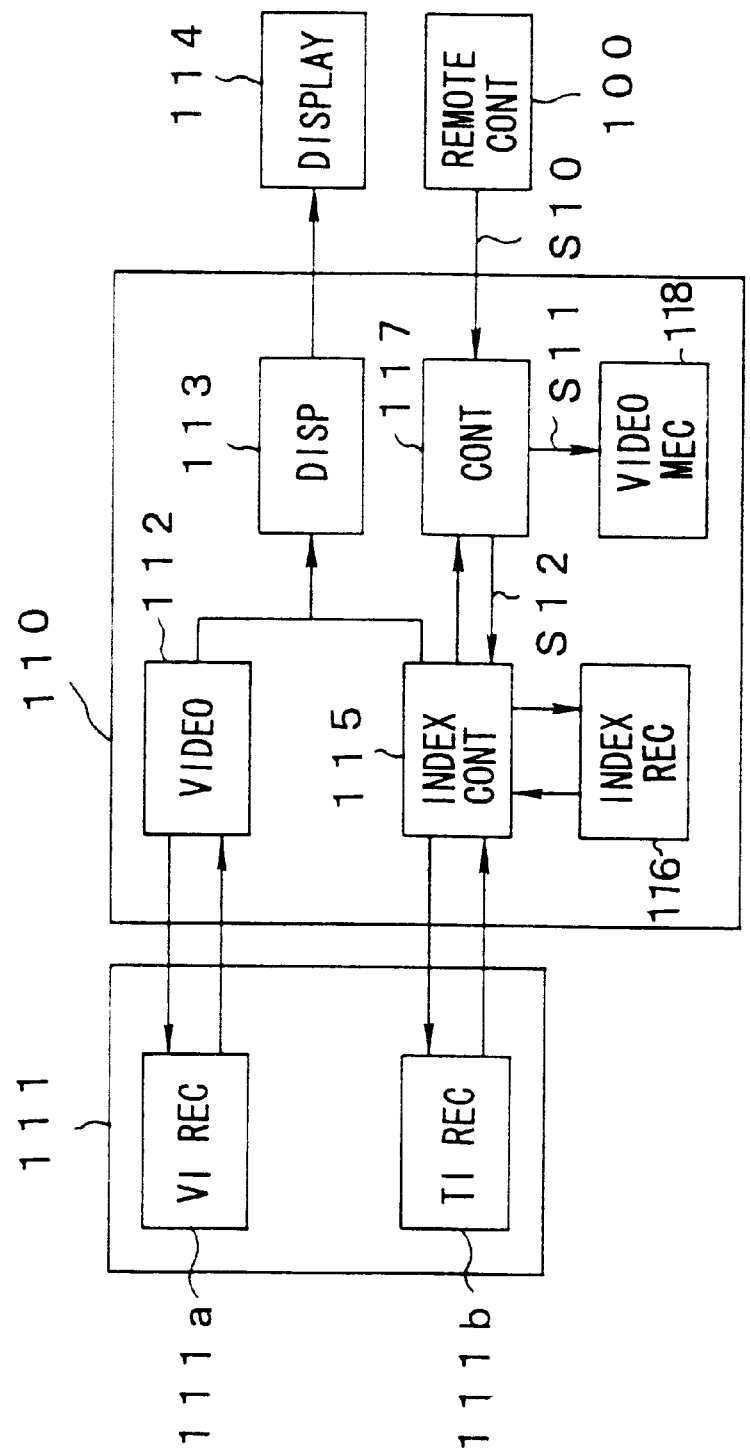
FIG. 38 is a block diagram showing a video cassette recorder manipulated by the remote control.

In FIG. 38, the numeral 110 shows a reproduction-only VCR apparatus which displays video information recorded in the recording region 111a of the tape 111 on the display 114 through the video circuit 112 and the display circuit 113, and tape information recorded in the tape information recording region 111b of the tape 111 is stored as index information in the index information memory 116 through the index control 115.

Index information stored in the index information memory 116 is displayed on the display 114 through the index control 115 and the display circuit 113.

The index information memory 116 stores information such as time codes, tape identification information and the total length of the tape as the tape information of the tape 111, and also stores the image information of the tape 111 corresponding to the time code, such as, information stored every 55 seconds as compressed images.

In the above structure, after pressing the play button 101 of the remote control 100, the pause button 103 is pressed and the switching lever 105 is set to the click action mode. At this time, when the roller 45 is rotated in the "r" direction (FIG. 37), a control signal S10 is transmitted from the remote control 100 to the control section 117 of the VCR device 110, as shown in FIG. 38. The control section 117 supplies a control signal S11 based on the control signal S10 to the video mechanism 118, which in turn controls the movement of the tape 111 and displays images on the display 114 sequentially synchronizing the click action of the roller 45.

However, when the roller 45 is rotated in the direction opposite to the "r" direction, images inversely fed are displayed on the display 114 in synchrony with the click action of the roller 45.

When the pause button 103 is pressed after pressing the play button 101 of the remote control 100, and the switching lever 105 is set to the center resetting mode, the video mechanism 118 controls the movement of the tape 111 corresponding to the rotational angle of the roller 45.

Figure 39:
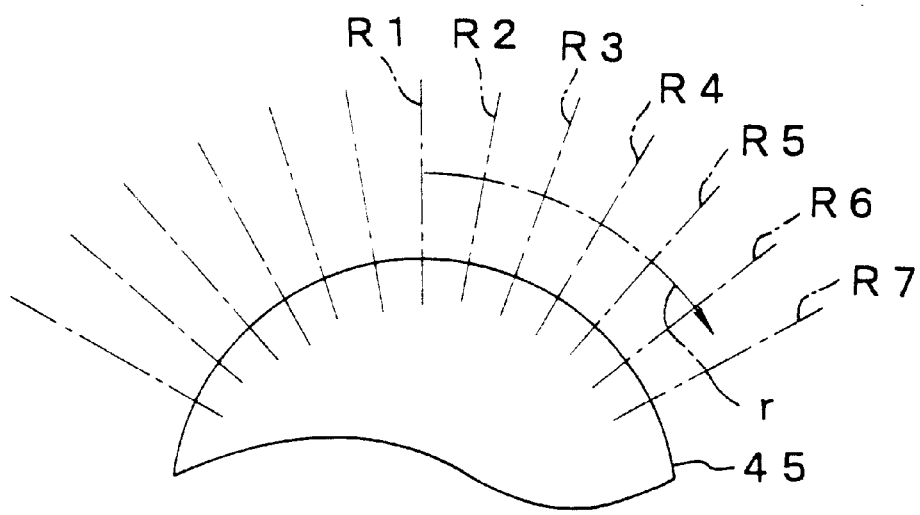
FIG. 39 is a schematic diagram illustrating the center resetting operation.

In this embodiment, as FIG. 39 shows, when the roller 45 is rotated in the "r" direction, the video mechanism 118 changes the movement of the tape 111 corresponding to the rotational positions R1, R2, R3, R4, R5, R6 and R7.

That is, when the rotational position is R1, i.e. the roller 45 is not rotated, a still picture is displayed on the display 114. At R2, pictures are displayed at one-tenth of normal speed; at R3, pictures are displayed at one-fifth of normal speed; at R4, pictures are displayed at normal speed; and at R5, pictures are displayed at twice normal speed. By rotating the roller 45 to R6, the search mode can be set, and by rotating the roller 5 to R7, the fast-forward mode can be set.

Similarly, when the roller 45 is rotated in the direction opposite to the "r" direction, the video mechanism 118 implements the rewind-and-reproducing mode or the rewind mode as desired by feeding the tape 111 in the opposite direction to the direction in the case described above, in the rotational position corresponding to the position of rotation in the "r" direction.

Furthermore, when the search button 104 of the remote control 100 is pressed, index information stored in the index information memory 116 is displayed on the display 114 through the index control 115 and the display circuit 113.

Figure 40:
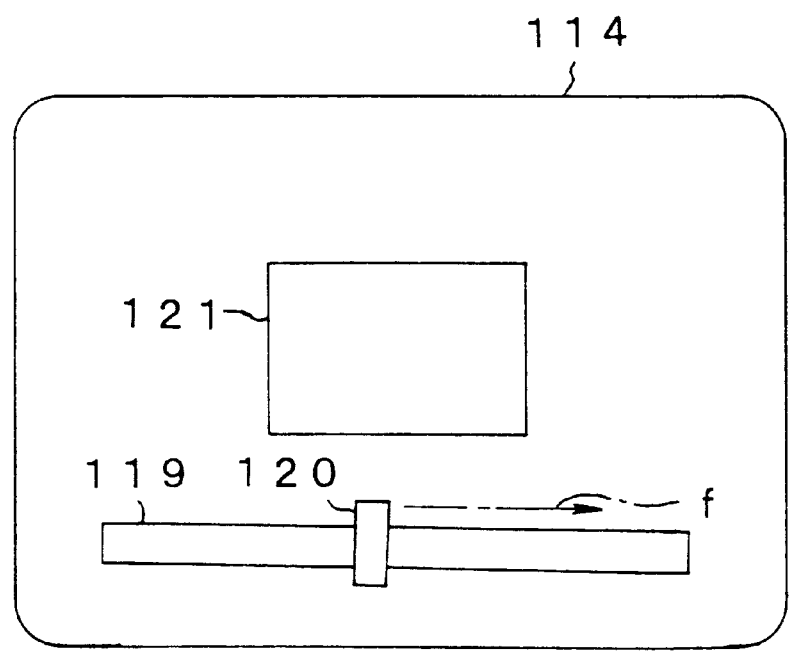
FIG. 40 is a schematic diagram of image indexing.

Index information is displayed, as FIG. 40 shows, on the bottom center of the screen of the display 114 as bar graph 119 (hereafter called search bar). The length of this search bar 119 indicates the play region of the tape 111. That is, the left end of the search bar 119 represents the starting position of the tape 111, and the right end of the search bar 119 represents the end position of the tape 111. A cursor 120 is displayed on the predetermined location on the search bar 119, and the picture corresponding to the cursor 120 is displayed on the central portion 121 of the display 114.

When the switching lever 105 is set to the click mode and the roller 45 is rotated in the "r" direction, the cursor 120 moves on the search bar 119 in the "f" direction. When the roller 45 is rotated in the opposite direction, the cursor 120 moves on the search bar 119 in the direction opposite to the "f" direction. The image corresponding to the location of the cursor 120 is displayed on the central portion 121 of the display 114.

Thus, when the operator 106 selects the desired cursor position and presses the play button 101, the index control 115 reads the time code corresponding to the selected image from the index information memory 116, and the tape 111 is played from the position of the time code.

According to the above structure, the roller device 41, which can switch between the click mode and the center resetting mode selectively by a single roller 45, is incorporated in the remote control 100, whereby the remote control 100, which has reduced size and can be operated easily with one hand, is obtained.

By moving and displaying the cursor 120 on the display 114 based on the operation of the roller 45, the remote control 100 with greatly improved maneuverability can be obtained.

Since the direction of rotation of the roller 45 agrees with the direction of the human recognition for time flow, the operator 106 can operate the roller 45 without confusion, and maneuverability is much improved.

(2-3) Other Embodiments

Although the roller device 41 is applied to the remote control 100 to control the movement of VCR tapes in the above embodiment, this invention is not limited to the above application but may be applied to the controls for channels and volume on the front panel of stand-alone devices, and to other various controllers.

Also in the above embodiment, the roller 45 is integrally supported by the shaft 44; however, this invention is not limited to such an embodiment, but the roller 45 may be rotatably installed on the shaft 44.

Although the click holes 54 are of the same number as the connecting holes 53 and located at the same intervals as the connecting holes 53 in the above embodiment, the number and the arrangement of the click holes are not limited to the above, but if a desired number of click holes are formed on the outer circumference and a desired number of click holes are formed also on the inner circumference, and the hard ball 55 fits either the click holes on the outer circumference or the click holes on the holes inner circumference, the distance between click holes can be selected.

Although in the above embodiment, the direction and the amount of rotation of the roller 45 are detected by providing a disk 90 on which slits 90a are formed, and by providing photocouplers 91 and 92 to generate detection signals S1 and S2 based on the slits 90a, this invention is not limited to the above. For example, a counter to count the number of clicks by the contact or lack of contact made by the hard ball 55 on every click action may be provided to detect the amount of rotation of the roller 45. Also, the state of rotation of the center resetting action may be detected by installing a plurality of photosensors at predetermined angles and a rod member to rotate integrally with the roller 45, and by making the photosensors detect said rod member in order to detect the rotational position of the roller 45. Thus, various detection means may be applied.

Although in the above embodiment, the cursor of the index information image is moved by the roller device 41, this invention is not limited to the above, but the roller device may be used as a controller to move, for example, the cursor of a computer. In this case, if click action is set to the low-speed movement of the cursor and the center resetting action is set to the high-speed movement of the cursor, maneuverability will much improved.

Figure 41:
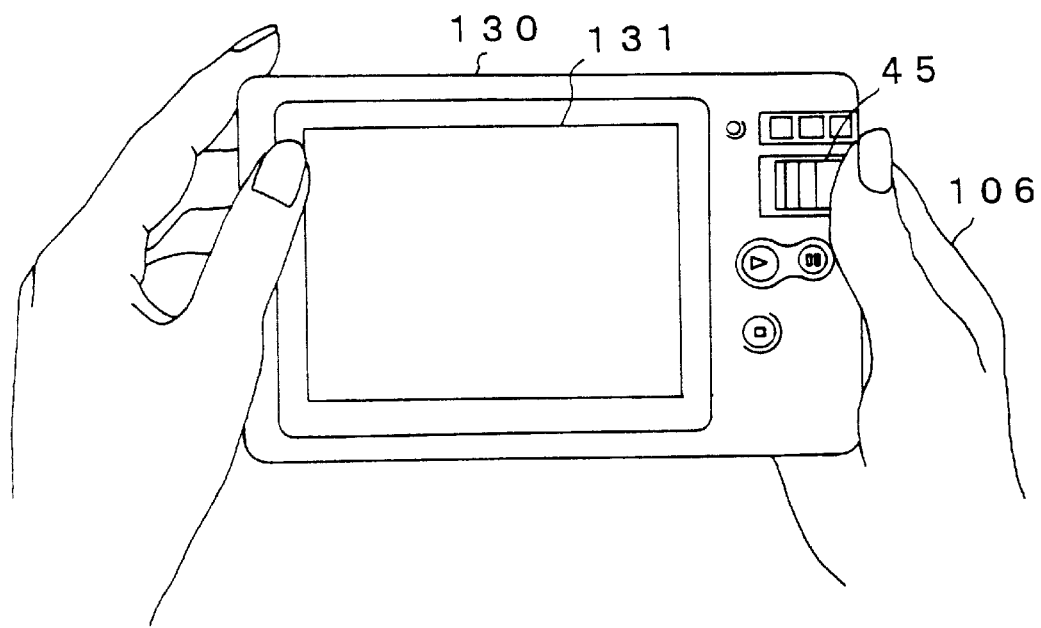
FIG. 41 is a sketch of a portable video cassette recorder in which an embodiment of a roller device is incorporated.

Furthermore, although in the above embodiment, the roller device 41 is incorporated in the remote control 100 of a VCR, the roller device 41 of this invention is not limited to the above, and may also be applied, for example, as shown in FIG. 41, to a portable video cassette recorder 130 in which a display 131, a video deck, and a controller are integrally formed. In this case, locating the roller device 41 on a handle on the side of display screen 131 would enable the operator 106 to operate the roller 45 easily with one hand.

(2-4) As described above, according to this invention, by providing a columnar controlling member rotatably supported on the shaft provided roughly parallel to the lengthwise direction of the operator's index finger, and by selectively switching the click mode and the center resetting mode of the rotational state of the controller, the size of the controller can be much reduced, and maneuverability is much improved.

Also according to this invention, by moving and displaying the cursor on the display screen based on the operation of the controller, a controller with greatly improved maneuverability is realized.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A controller comprising:
    a roller member rotatably supported on a shaft, said shaft being arranged so as to be roughly parallel to a longitudinal direction of one of an index finger or a thumb of an operator when the operator holds said controller and the respective one of the operator's index finger or thumb is placed on said roller member for rotating said roller member;
    click means operable in a click mode for controlling the rotational position of said roller member at predetermined intervals;
    resetting means operable in a resetting mode for resetting said roller member to the predetermined rotational position;
    switching means for selecting a desired one of said click means and said resetting means; and
    rotation detecting means for detecting the rotation of said controlling member and outputting the results of detection as controlling signals,
    wherein said roller member is arranged such that said click means and said resetting means are respectively operable in said click mode and said resetting mode without the use of another roller member.

2. A controller according to claim 1, wherein said roller member is installed on the handle of a remote control to remotely control a picture regenerator.

3. A controller according to claim 2 controlling the running conditions of the picture recording media in said picture regenerator based on the controlling signals from said rotation detecting means.

4. A controller according to claim 2, further comprising:
    selected object displaying means which display the predetermined selected region or a plurality of selected objects on a display screen; and
    cursor displaying means which move and display a cursor along said selected region or selected objects based on the controlling signals from said rotation detecting means.

5. A controller according to claim 1, wherein said roller member is installed on the handle at one side of the display screen of the image regenerator.

6. A controller comprising:
    a single roller member rotatably supported on a shaft and operable in a click mode and a center resetting mode;
    switching means for selecting a desired one of said click mode and said center resetting mode; and
    rotation detecting means for detecting the rotation of said roller member and outputting the results of detection as controlling signals,
    wherein said single roller member is arranged such that said click mode and said center resetting mode are operable without the use of another roller member,
    wherein said roller member is arranged so as to be slidably movable in a direction substantially parallel to said shaft, and
    wherein said shaft is arranged so as to be roughly parallel to a longitudinal direction of one of an index finger or a thumb of an operator when the operator holds said controller and the respective one of the operator's index finger or thumb is placed on said roller member for rotating said roller member.

* * * * *